July 6, 1948.    M. A. GOODBAR ET AL    2,444,564
CASH REGISTER TICKET FEEDING AND PRINTING MECHANISM
Filed Dec. 6, 1944    7 Sheets-Sheet 1
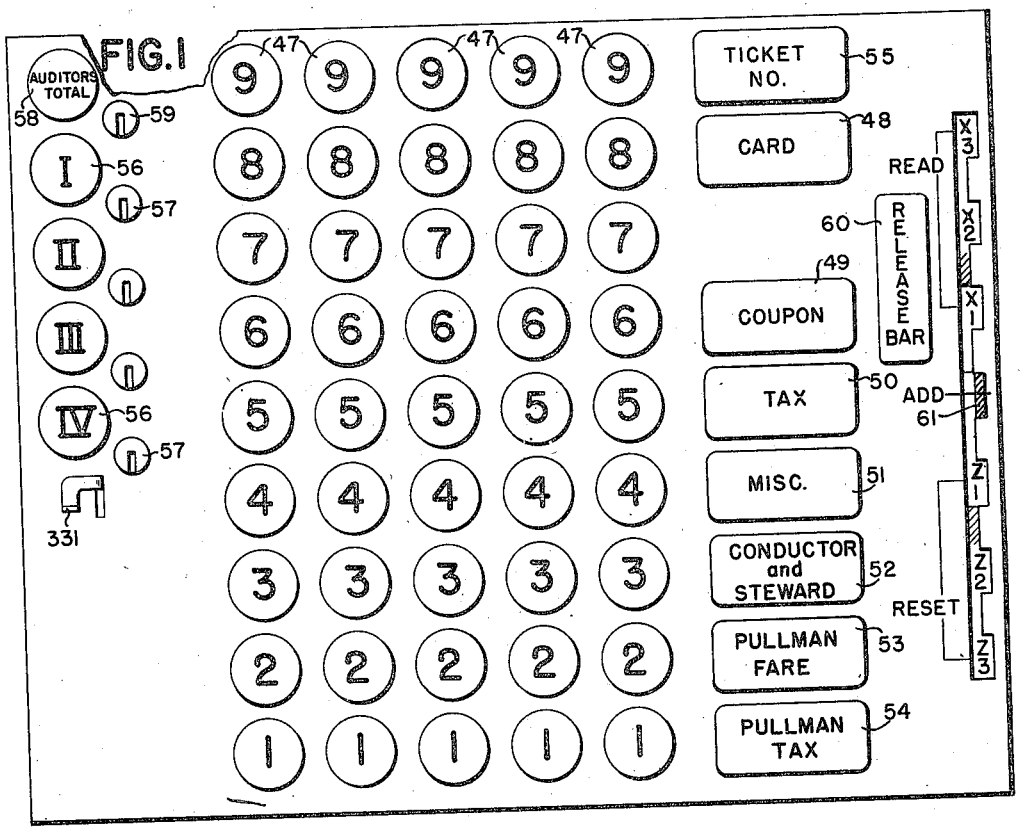
FIG.3
1st. Print. Fare on Stub.
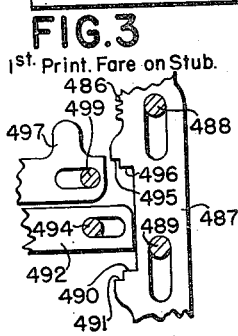
FIG.4
2nd. Print. Fare on Ticket.
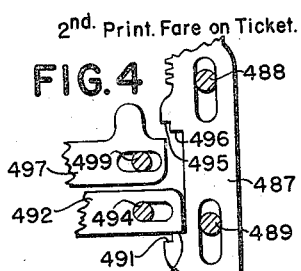
FIG.2
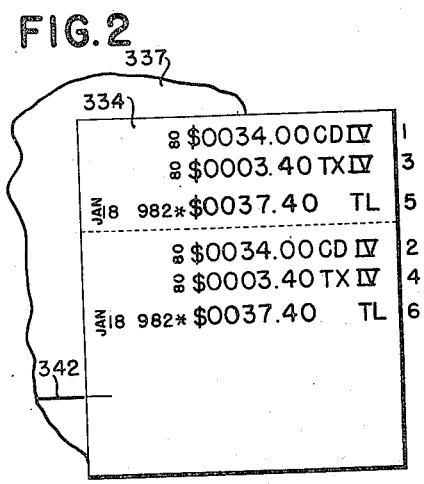
FIG.5
3rd. Print. Tax on Stub.
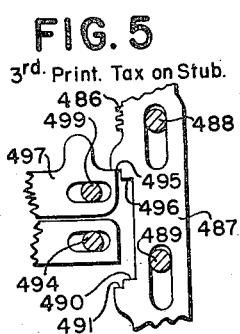
FIG.6
4th. Print. Tax on Ticket.
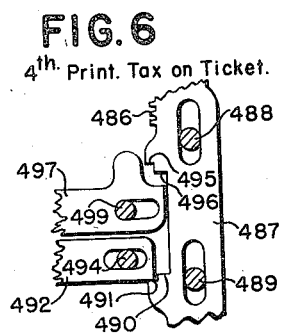
Inventors
MAYO A. GOODBAR
AND GEORGE A. COCUP
By Carl Beust
Their Attorney July 6, 1948.  M. A. GOODBAR ET AL  2,444,564
CASH REGISTER TICKET FEEDING AND PRINTING MECHANISM
Filed Dec. 6, 1944  7 Sheets-Sheet 2
FIG.9
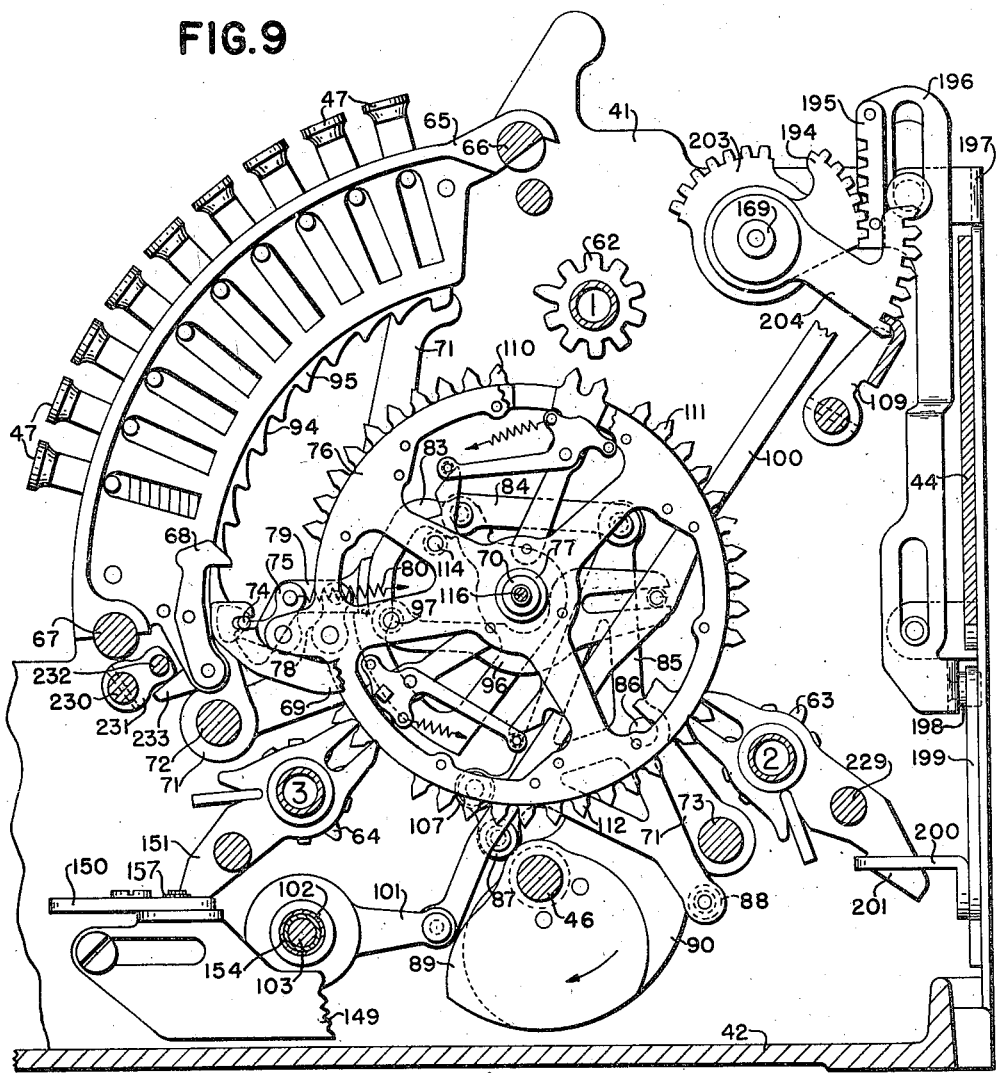
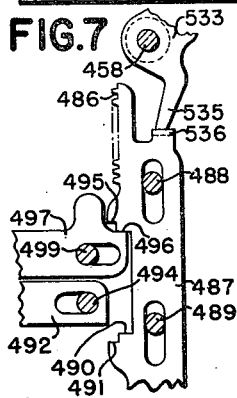
5th. Print. Total on Stub.
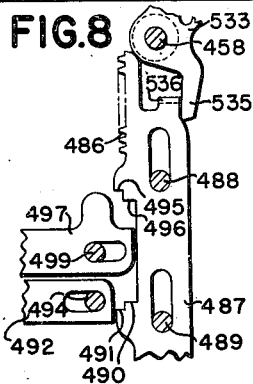
6th. Print. Total on Ticket.
Inventors
MAYO A. GOODBAR
AND GEORGE A. COCUP
By *Pearl Benet*
Their Attorney July 6, 1948.  M. A. GOODBAR ET AL  2,444,564
CASH REGISTER TICKET FEEDING AND PRINTING MECHANISM
Filed Dec. 6, 1944  7 Sheets-Sheet 3
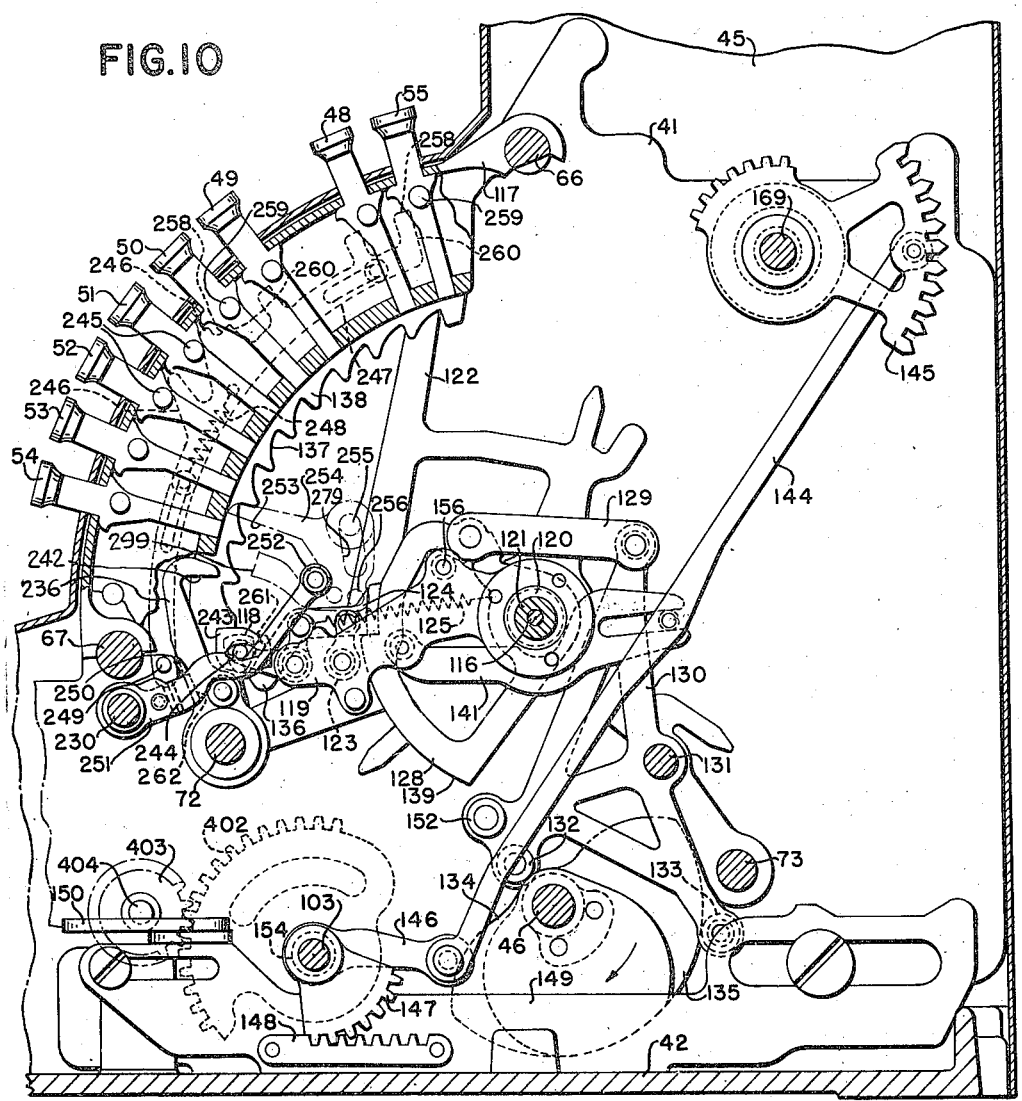
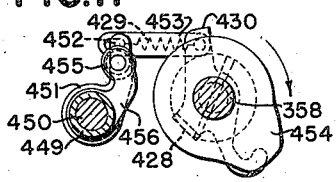
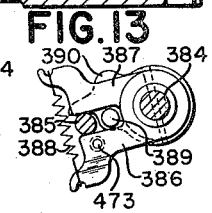
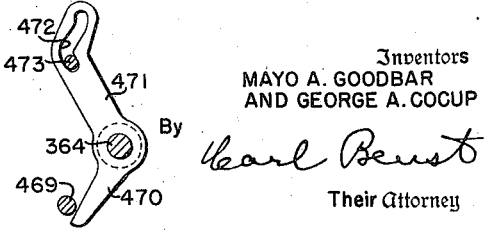
Inventors
MAYO A. GOODBAR
AND GEORGE A. COCUP
By Carl Beust
Their Attorney July 6, 1948. M. A. GOODBAR ET AL 2,444,564
CASH REGISTER TICKET FEEDING AND PRINTING MECHANISM
Filed Dec. 6, 1944 7 Sheets-Sheet 5
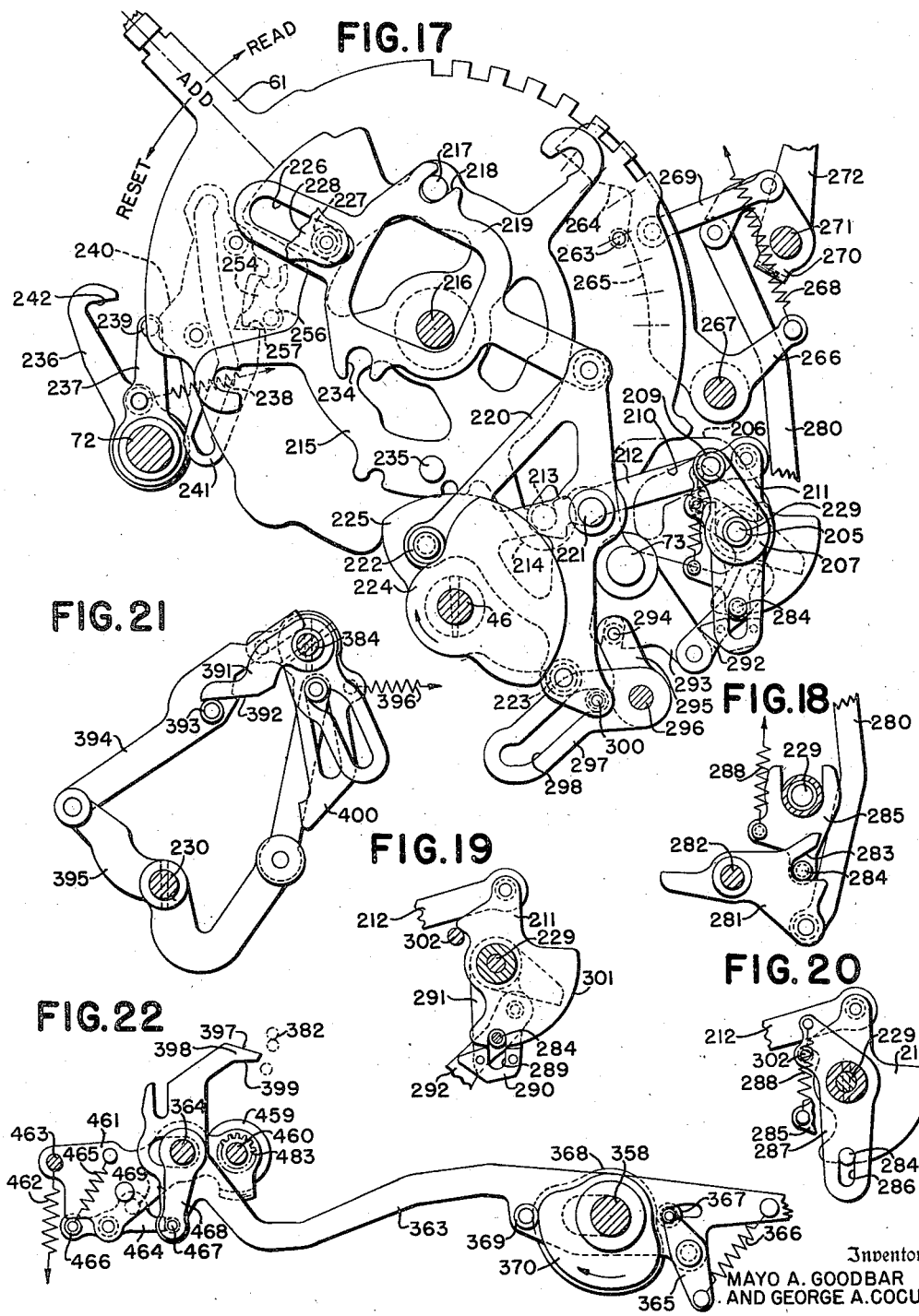
Inventors
MAYO A. GOODBAR
AND GEORGE A. COCUP
By Carl Beust
Their Attorney July 6, 1948. M. A. GOODBAR ET AL 2,444,564
CASH REGISTER TICKET FEEDING AND PRINTING MECHANISM
Filed Dec. 6, 1944 7 Sheets-Sheet 6
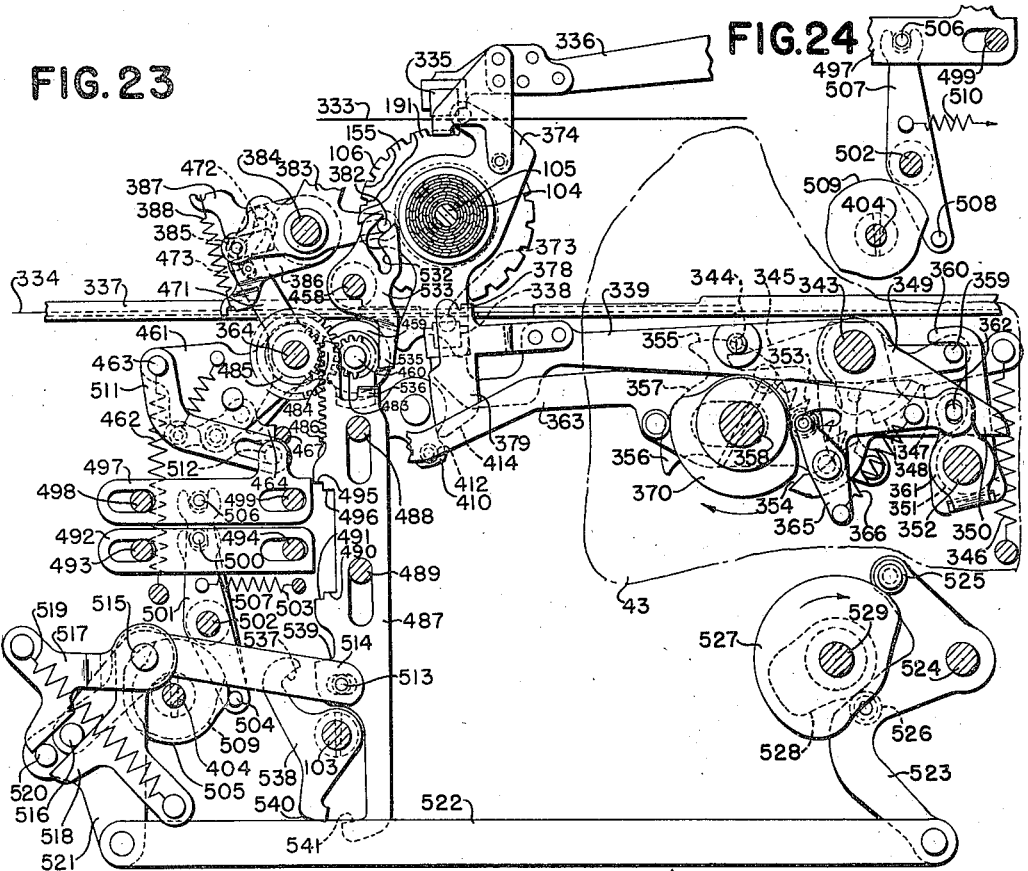
FIG. 23
FIG. 24
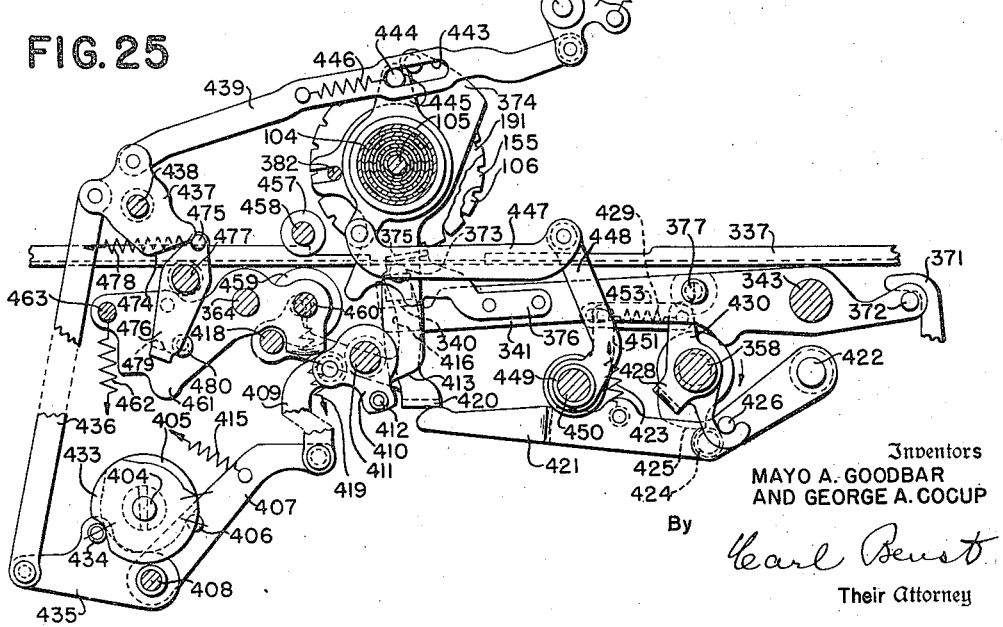
FIG. 25
Inventors
MAYO A. GOODBAR
AND GEORGE A. COCUP
By
Carl Beust
Their Attorney July 6, 1948.   M. A. GOODBAR ET AL   2,444,564
CASH REGISTER TICKET FEEDING AND PRINTING MECHANISM
Filed Dec. 6, 1944   7 Sheets-Sheet 7

Inventors
MAYO A. GOODBAR
AND GEORGE A. COCUP
By Carl Beust
Their Attorney

Patented July 6, 1948

2,444,564

UNITED STATES PATENT OFFICE 2,444,564

CASH REGISTER TICKET FEEDING AND PRINTING MECHANISM

Mayo A. Goodbar and George A. Cocup, Dayton, Ohio, assignors to The National Cash Register Company, Dayton, Ohio, a corporation of Maryland Application December 6, 1944, Serial No. 566,828

20 Claims. (Cl. 101—68)

This invention relates to cash registers and/or accounting machines, and is particularly directed to the printing mechanisms and the record material feeding mechanisms of such machines.

Speaking in general terms, the main object of this invention is to provide improved means for feeding record material so that it will receive a plurality of successive impressions from the printing mechanisms of accounting machines.

Another object of the present invention is the provision of means for causing duplicate records of various entries to be recorded upon separate portions of a record strip.

A further object of the present invention is to provide means for causing a plurality of duplicate records, constituting a single transaction, to be recorded upon separate portions of a record slip.

Another object of the invention is to supply means to feed record material back and forth, in relation to the printing means, so that identical recordings will be made upon separate portions of said record material.

Still another object is the provision of means to cause original recordings of the items and the item total of a multiple-item transaction to be made upon two separate portions of a record slip.

Still another object of this invention is to provide a machine, of the character referred to above, with means to record the items and the item total of a multiple-item transaction upon the stub portion and upon the main portion of a record slip.

A further object is to provide a machine, of the character referred to above, with means for printing identical data upon a stub portion and upon a main portion of the record material in a single operation of the machine.

Another object is to provide a machine, having impression means which makes two impression strokes in each machine operation, with means to feed insertable record material back and forth in relation to the impression means, so that two identical records will be made upon a stub portion and upon a main or receipt portion of said record material.

Still another object is to supply means to control the above impression means so that only one impression will be made upon the insertable record material in certain types of machine operations.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 1 is a diagrammatic view of the keyboard of the machine embodying the present invention.

Fig. 2 is a facsimile of one type of ticket prepared on the machine of this invention.

Figs. 3 to 8 inclusive are fragmentary detail views showing the slip feeding slide and associated mechanisms in their different stages of movement to control the back and forth feeding of the insertable slip or ticket during the item entering and item total operations of a complete multiple-item transaction.

Fig. 9 is a cross-sectional view taken just to the right of one of the amount banks, as observed from the right-hand side of the machine, showing said amount bank and the differential mechanism associated therewith.

Fig. 10 is a cross-sectional view taken just to the right of the transaction bank, as observed from the right-hand side of the machine, showing said transaction bank and the differential mechanism associated therewith.

Fig. 11 is a detail view of a part of the mechanism for controlling the printing hammers in single-item operations.

Figs. 12, 13, and 14 are detail views of a part of the mechanism shown in Fig. 23 for controlling the record slip tension and feeding mechanisms.

Figure 15:
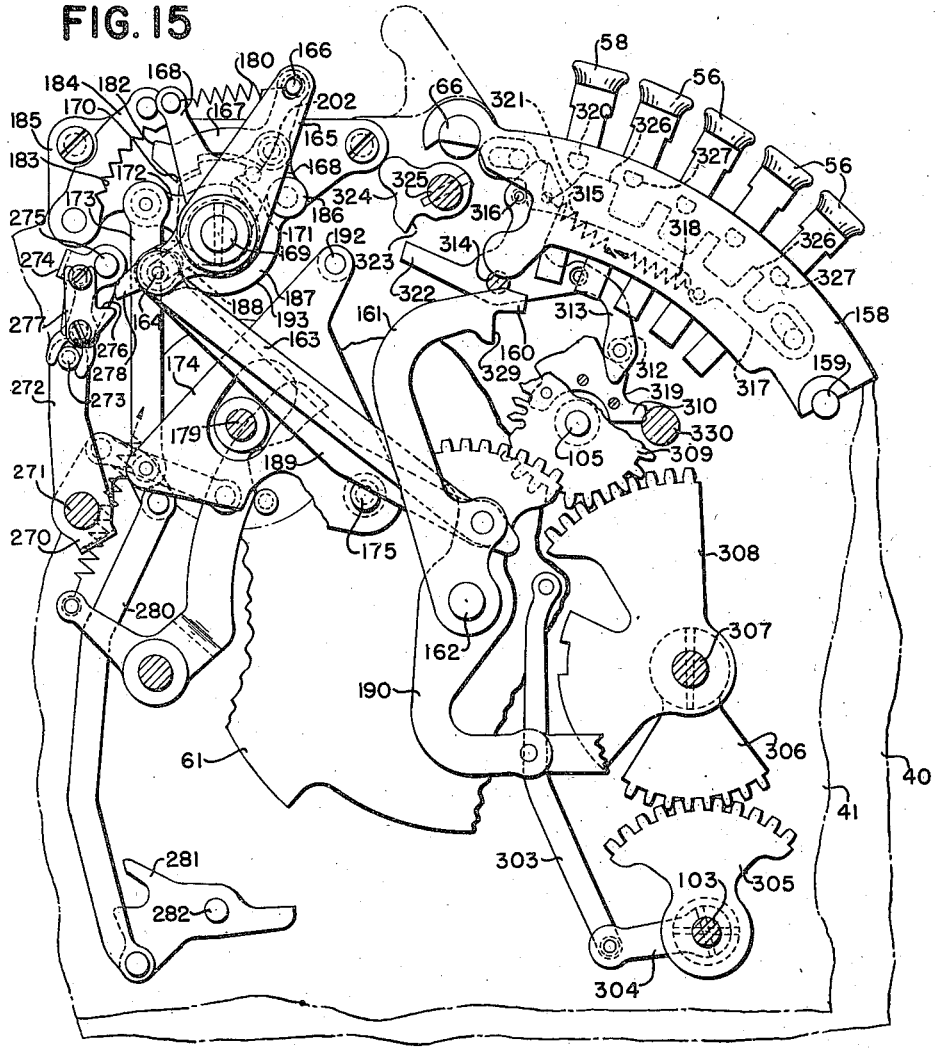

Fig. 15 is a transverse sectional view taken just to the left of the operator's bank and shows in particular the mechanism for automatically transferring totals from the item totalizer to one of the totalizers on the operator's totalizer line.

Figure 16:
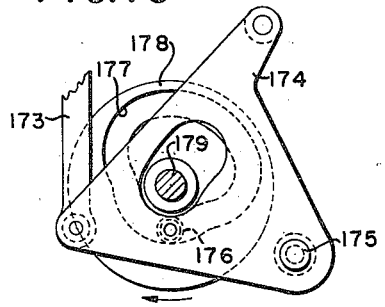

Fig. 16 is a detail view of the cam and cam lever associated therewith for operating the differential mechanism for the operator's bank.

Fig. 17 is a right-hand elevation of the total control lever and the mechanism controlled thereby for effecting the automatic transfer of totals from the item totalizer to another totalizer.

Figs. 18, 19, and 20 are detail views of certain parts of the automatic total transferring mechanism.

Fig. 21 is a detail view of the mechanism controlled by the total control lever for rocking the zero throwout shaft in total recording operations.

Fig. 22 is a right-hand elevation of a portion of the record slip tension and feeding mecha- Fig. 23 is a right side elevation of the record material feeding mechanism and the impression mechanism.

Fig. 24 is a detail view of one of the controlling levers and associated operating cam for feeding the record material.

Fig. 25 is a right side elevation of a part of the mechanism for controlling the record slip feeding and tension mechanisms and the record slip printing hammers.

Figure 26:
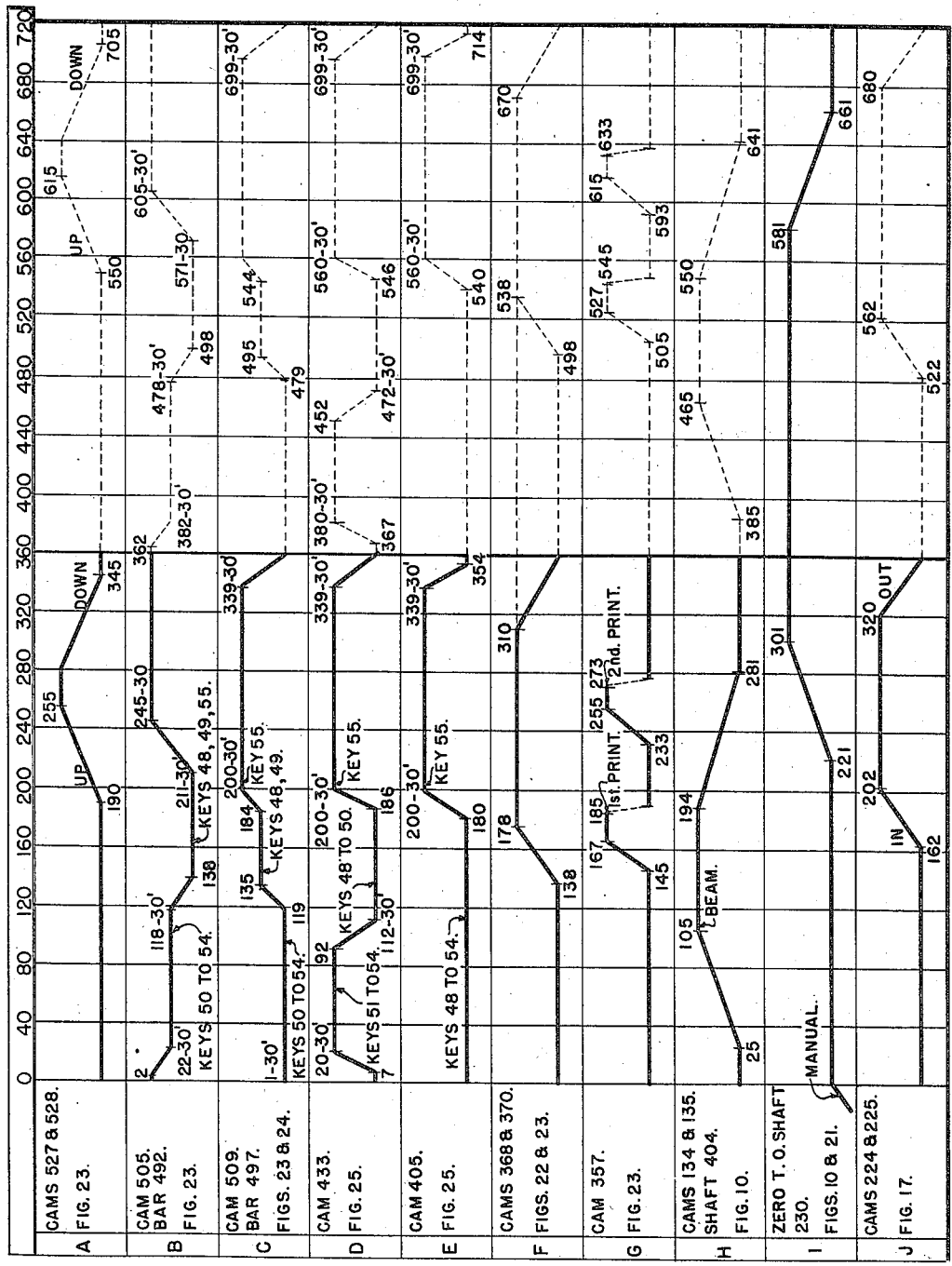

Fig. 26 is a chart giving in graphic form the timing of the movements of the important mechanisms of the machine of the present invention.

GENERAL DESCRIPTION

The present invention is shown as applied to machines of the general type disclosed in Letters Patent of the United States Nos. 1,817,883 and 1,865,147, issued, respectively, August 4, 1931, and June 28, 1932, to Bernis M. Shipley.

Like the machines disclosed in the above-mentioned United States patents, the machine of the present invention is capable of single-item transactions, multiple-item transactions, and totalizing operations, and said machine, due to its versatility, is adaptable to many types of business systems, but in the present application it is shown adapted for use in railroad ticket offices for the printing and issuing of card and/or coupon railroad tickets. However, it is not the desire to limit the machine of this invention to any particular use or system, and the present example is obviously only one of the many ways in which a machine having the features and characteristics of this machine may be used.

In its present adaptation, the machine embodying the present invention is provided with five rows or banks of amount keys which control the positioning of corresponding differential mechanisms which in turn control the positioning of corresponding indicators and printing wheels whereby the value set up on the amount keys may be indicated and recorded. The five rows of amount keys, in addition to being used for setting up amounts, may also be used for setting up ticket numbers to be recorded on the audit strip and indicated at the same time.

The present machine is also provided with a row of transaction or item keys corresponding to the various items involved in the selling and printing of railroad tickets. The machine likewise includes a row four operator's or clerk's keys for identifying the various operators of the machine, and included with the row of operators' keys is an Auditor's Total key, the function of which will be explained later.

The machine is electrically operated under normal conditions but may be operated by hand if for any reason it is necessary or desirable. All of the transaction or item keys are motorized keys, in that the depression of any of these keys releases the machine for operation, and said machine is also provided with a regular starting bar for starting the machine mechanism in certain total and sub-total recording operations.

The machine embodying the present invention is equipped with three totalizer lines—a No. 1 or item totalizer line, a No. 2 or operator's totalizer line, and a No. 3 or transaction totalizer line. The machine is likewise provided with a total control lever which is normally in a central or adding position and, when in such position, controls the totalizer engaging mechanism to engage the selected set of totalizer wheels with the amount actuators in adding time, in the usual and well-known manner. The total control lever is movable upwardly to any one of three positions to select the No. 1, the No. 2, or the No. 3 totalizer line for engaging and disengaging movement with and from the amount actuators in sub-total or reading time. The total control lever is also movable from adding position downwardly to any one of three positions to select the No. 1, the No. 2, or the No. 3 totalizer line for engaging and disengaging movement with and from the amount actuators in total recording or resetting time.

The transaction or item keys, in addition to initiating operation of the machine in adding operations, also select the item totalizer for engaging and disengaging movement with and from the amount actuators. Likewise, the transaction keys select the corresponding set of totalizer wheels on the No. 3 totalizer line for engagement with the amount actuators in adding operations, so that totals of the various items will be accumulated in the corresponding totalizers on the No. 3 totalizer line. In adding operations, the four operators' keys select a corresponding set of totalizer wheels on the No. 2 totalizer line for engagement with the amount actuators, so that a grand total of all the transactions handled by each operator will be accumulated in the corresponding totalizer. Each of the four operator's keys is provided with a lock and key for locking said keys against depression by unauthorized persons.

As previously explained, all of the transaction keys, in addition to selecting their corresponding totalizer on the No. 3 totalizer line, likewise select the item totalizer for the accumulation of the amounts of the various items, and, in order to complete a multiple-item transaction, it is necessary to move the total control lever to No. 1 Reset or item total position and initiate operation of the machine by depression of the regular starting bar. In this operation of the machine, the item totalizer is cleared and the amount therein is set up on the indicators, recorded upon the record material, and simultaneously automatically transferred to the auditor's totalizer on the No. 2 or operators' totalizer line.

Inasmuch as all the items of either a single-item transaction or a multiple-item transaction are accumulated in the item totalizer and the amount in the item totalizer is always transferred to the auditor's totalizer, it is obvious that a grand total of the transactions handled by all the operators of the machine is accumulated in the auditor's totalizer. An interlock between the auditor's key and the amount keys prevents the release of the machine for operation when these keys are depressed at the same time. Likewise, a control plate in the operators' bank prevents the depression of both an operator's key and the Auditor's Total key at the same time. In other words, when an operator's key is depressed, the Auditor's Total key is locked against depression, and, when the Auditor's Total key is depressed, all of the operator's keys are locked against depression.

The auditor's totalizer may be read at any time by any person by moving the total control lever to the No. 2 Read position, depressing the Auditor's Total key, and releasing the machine for operation by depressing the regular starting bar. However, movement of the total control lever to No. 2 Reset position renders mechanism effective which locks the machine against operation, to prevent resetting of the auditor's total by unauthorized persons. The Auditor's Total key is provided with a lock and key for rendering the above locking means ineffective, so that the possessor of the key to the auditor's total lock may reset the auditor's total whenever desirable.

The totalizers on the No. 3 totalizer line corresponding to the item or transaction keys may be read or reset, respectively, by moving the total control lever to No. 3 Read or No. 3 Reset position and by selecting the corresponding transaction totalizers by depression of the corresponding transaction keys, which also simultaneously initiate machine operation.

The totalizers on the No. 2 totalizer line corresponding to the operators' keys may be read or reset, respectively, by moving the total control lever to No. 2 Read or No. 2 Reset position, by depressing the operator's key for the totalizer which it is desired to read or reset, and by depressing the regular starting bar to initiate machine operation.

The machine is arranged to print identical data upon a removable stub portion and upon a main portion of an insertable slip, which in this particular adaptation of the machine is a railroad ticket. Likewise, the machine simultaneously records all transactions upon an audit strip, which is retained in the machine and the printed portion of which may be removed when desirable for comparing and auditing purposes.

The preparation of a railroad ticket is a multiple-item transaction requiring the entering of two items and an item total thereof upon the stub or removable portion of the ticket and upon the main portion of said ticket. To accomplish the duplicate printing of each item and the item total thereof upon the separate portions of the ticket requires that the impression hammer make two strokes each machine operation first to print upon the stub portion of the ticket and then to print the same data upon the main portion of said ticket. Also, to accomplish this result, it is necessary to feed the ticket back and forth so that the first impression of each entry will be made upon the stub and the second entry upon the main portion of said ticket, and to simultaneously line-space the ticket so that the duplicate printing of the two items and the item total thereof will be printed in sequential order upon both the stub portion and the main portion of said ticket.

In the preparation of a ticket on the machine embodying the present invention, the card or coupon ticket blank having the proper stations and other data thereon is placed upon the slip table of the machine and inserted in the machine until the first printing position on the stub or removable portion of said ticket is opposite the printing line. Then the proper operator's key is depressed and the amount of the fare is set up on the amount keys, after which the proper transaction key—in this case, the Card or Coupon key—is depressed, to initiate operation of the machine. During this first item-entering operation of the machine, the first impression stroke of the printing hammer causes the amount of the fare to be printed in the first printing position upon the stub portion of the ticket. The ticket is then fed inwardly to aline the first printing position on the main portion thereof with the printing line, after which the printing hammer performs a second stroke to print the identical data upon the main portion of said ticket.

Near the end of the first item-entering operation, the ticket is returned forwardly, not to its original position, but to the proper position to cause the next item to be printed directly beneath the first item upon the stub or removable portion of said ticket. The ticket feeding and pressure rolls remain engaged to insure that the ticket is retained in proper alinement with the printing mechanism. The depressed operator's key remains depressed during the two item-entering operations, and therefore it is not necessary to depress the operator's key again in the succeeding item operation.

In the second item-entering operation of the machine, the amount of the tax on the railroad fare is set up on the amount keys and the Tax key is depressed to initiate machine operation, during which the first impression stroke of the printing hammer causes the amount of the tax to be printed upon the stub portion of the railroad ticket directly beneath the first item. Prior to the second stroke of the printing hammer, the railroad ticket is fed inwardly to aline the second printing position on the main portion thereof with the printing mechanism, after which the second stroke of the printing hammer causes the amount of the tax to be recorded upon the main portion of said ticket.

Near the end of the second item-entering operation, the ticket is returned outwardly a sufficient distance to aline the third printing position on the stub portion thereof with the printing line.

To complete the series of three operations, the total control lever is moved from adding position to No. 1 Reset position or item total position, and, as before, it is unnecessary to depress the operator's key, as said key remains depressed at the end of the second item-entering operation. After the total control lever has been moved to item total position, depression of the regular starting bar initiates operation of the machine, during which the item totalizer is totalized or reset and the printing wheels are positioned in accordance with the value of the amount therein.

In the item total operation, the first impression stroke of the printing hammer causes the total amount of the railroad fare and the tax to be recorded in the third position upon the stub or removable portion of the ticket, and, immediately after such recording, the ticket feeding mechanism functions to move said ticket inwardly to aline the third printing position on the main portion thereof with the printing line, whereupon the second impression stroke of the hammer causes the item total to be recorded upon said main portion of the ticket. At the end of the item total operation, the total control lever is automatically restored to adding position, and the depressed operator's key is released in preparation for the next ticket printing transaction.

Movement of the total control lever from adding position to item total position sets up a condition which causes the auditor's totalizer on the No. 2 totalizer line to be selected for an adding operation, to transfer the amount of the item total from the item totalizer to said auditor's totalizer. In the item-entering operations of the ticket-printing transaction, the total amount of the fare, in addition to being entered in the item totalizer, is simultaneously entered in the totalizer on the No. 3 line corresponding to the depressed transaction key and in the operator's totalizer on the No. 2 totalizer line corresponding to the depressed operator's key. At the end of the item total operation, the feeding and pressure rollers for the ticket are released so that the completed ticket may be removed from the machine.

The mechanism for feeding the ticket slip back and forth, so that duplicate recordings of the two items and the item total thereof will be made upon the stub or removable portion and the main portion of said ticket, embraces many novel and original features, which will be explained fully later herein.

In addition to the multiple-item, ticket-printing transaction explained above, the machine is also arranged for single-item transactions for the registering and recording of miscellaneous cash, for example, and conductors' and stewards' cash receipts. Single-item transactions are very much like multiple-item transactions, with the exception that there is no automatic feeding of the insertable slip upon which the amounts of the items are recorded, and the impression hammer makes only one impression stroke to print the single item once upon the insertable record slip. If there is more than one single-item entry to be recorded, it is necessary to hand-feed the insertable slip, as the automatic feeding mechanism does not function in single-item transactions. Like the items of multiple-item transactions, single items are accumulated in the item totalizer; therefore, after the recording of all the single items, it is necessary to move the total control lever to item total or No. 1 Reset position in order to print a total of the single items and simultaneously automatically transfer the amount of the total of said items from the item totalizer to the auditor's totalizer, the same as in multiple-item transactions.

In operations to read or reset the transaction totalizers on the No. 3 totalizer line, movement of the total control lever to No. 3 Read or No. 3 Reset position disables the ticket-feeding mechanism, and this is also true in operations to read or reset the operators' totalizers or the auditor's totalizer on the No. 2 totalizer line, for movement of the total control lever to No. 2 Read or No. 2 Reset position disables the ticket feeding mechanism, and therefore, in these reading and resetting operations, it is necessary to hand-feed the insertable record material upon which the totals are being recorded.

In the ensuing pages, mechanism pertinent to a proper understanding of the present invention will be described in detail.

DETAILED DESCRIPTION

Framework and machine operating mechanism

The mechanism of the machine is supported by and between a right side frame 40 (Fig. 15) and a left side frame 41 (Figs. 9, 10 and 15), said frames being secured to a machine base 42. The printing mechanism of the machine is supported by a printer frame 43 (Fig. 23), which is secured in proper spaced relationship to the left frame 41 by various studs, bars, and rods extending therebetween. A back plate 44 (Fig. 9) extends between the main frames 40 and 41 and is also secured to the machine base 42, and assists in maintaining the main frames in rigid relationship to each other. The mechanism of the machine is enclosed in a suitable case or cabinet 45 (Fig. 10), which is in turn secured to the machine base 42.

Under normal conditions, the machine chosen to illustrate the present invention is driven by an electric motor, but a hand crank is provided for manually operating the machine in case it is necessary or desirable. The electric operating motor is provided with a clutch mechanism and gearing to connect it to a main cam shaft 46 (Figs. 9, 10 and 17), said clutch mechanism being controlled in the usual manner by the key lock shaft, which is in turn controlled by the motorized transaction keys and the regular starting bar.

The operating motor and the mechanism for connecting it to the main cam shaft 46 have not been illustrated herein and will not be described further, as this mechanism is old in the art, having been disclosed repeatedly in United States patents relating to machines of this character for example, the Kettering and Chryst Patent No. 1,144,418, issued June 29, 1915.

In adding operations, the main cam shaft 46 makes one cycle of movement or one clockwise revolution (Fig. 9), and in reading and resetting or sub-total and total recording operations said cam shaft makes two cycles of movement or two clockwise revolutions, the additional cycle or revolution being necessary to properly aline the selected set of totalizer wheels with the amount actuators. The total control lever controls the cycling or revolutions of the main cam shaft 46, and, when said total control lever is in adding position, said shaft makes one cycle or one clockwise revolution; and, when said total control lever is in any of its reading or resetting positions, said main cam shaft makes two cycles or two clockwise revolutions.

Such cycling control is fully described in United States patents to Frederick L. Fuller, No. 1,242,170, issued October 9, 1917, and to B. M. Shipley, No. 1,619,796, issued March 1, 1927, and also the two Shipley Patents Nos. 1,817,883 and 1,865,147, previously mentioned.

Keyboard

The keyboard of the machine, which is shown in diagrammatic form in Fig. 1, comprises five rows of amount keys 47, which, through their corresponding differential mechanisms, control the entering of amounts in the different totalizers and also control the positioning of the indicating and printing mechanisms. The keyboard also includes a row of transaction keys comprising seven item keys 48 to 54 inclusive, and a Ticket Number key 55, which latter is used in conjunction with the amount keys for printing a record of the ticket numbers upon the audit strip. The keyboard of the machine includes four operators' or clerks' keys 56 (Fig. 1), each one having a corresponding lock 57 and a key, not shown, for locking said keys against depression by unauthorized persons. The operators' row of keys also includes an Auditor's Total key 58 and a corresponding lock 59, the function of which will be explained later.

The keyboard of the present machine also includes a regular type of starting bar 60 for initiating machine operations in which none of the item keys 48 to 54 inclusive or the key 55 is used, as all of these keys are what are often termed "motorized keys" and initiate operation of the machine.

The keyboard of the machine also includes a total control lever 61 (Fig. 1) for controlling the various functions of the machine. Normally the total control lever 61 is in central or Add position, as shown here, and, when in this position, it causes the various totalizers to be engaged and disengaged with and from the amount actuators in adding time. The total control lever 61 is movable upwardly from Add position to No. 1, No. 2, or No. 3 Read position, in which the No. 1, No. 2, and No. 3 totalizer lines are selected, respectively, for engaging and disengaging movement with and from the amount actuators in reading or sub-total timing. The lever 61 is also movable downwardly to the No. 1, 2 or 3 Reset position whereby the No. 1, 2 or 3 totalizer, respectively, is selected for cooperation with the amount actuators in reset or total timing.

Totalizers in general

Referring to Figs. 1 and 9, the machine chosen to illustrate the present invention is provided with three totalizer lines—namely, a No. 1 or upper totalizer line, a No. 2 or back totalizer line, and a No. 3 or front totalizer line—said totalizer lines being spaced around the amount actuators.

The No. 1 totalizer line has one set of item totalizer wheels 62 thereon, which are selected for engagement with the amount actuators by the item keys 48 to 54 inclusive, and the No. 2 totalizer line has thereon four sets of wheels 63 corresponding to the four operators' keys 56, said sets of totalizer wheels being selected by said operators' keys. The No. 2 totalizer line also has one set of wheels thereon corresponding to and selected by the Auditor's Total key 58 for engagement with the amount actuators. The No. 3 or front totalizer line has seven sets of wheels 64 thereon corresponding to the seven item keys 48 to 54 inclusive and selected by said keys for engagement with the amount actuators in the usual manner.

The mechanism for imparting engaging and disengaging movement to the totalizer lines is old in the art and is fully disclosed in the Shipley patents referred to earlier herein. However, the mechanism for imparting engaging and disengaging movement to the No. 2 totalizer line is shown briefly in Fig. 17 and will be explained in a general way later herein in connection with the automatic transferring of item totals from the item totalizer to the auditor's totalizer.

Amount keys and differential mechanism

Inasmuch as the five amount banks and their corresponding amount differential mechanisms are of similar construction, it is believed that a description of the amount bank and its corresponding differential mechanism, shown in Fig. 9, will be sufficient for all five.

Referring now to Fig. 9, which illustrates the bank of amount keys which is to be described as representative of all of the amount banks, the amount keys 47 are depressibly mounted in corresponding slots in a key frame 65 removably supported by rods 66 and 67 extending between the main frames 40 and 41.

The amount keys 47 are depressibly mounted in a key frame 65 supported on rods 66 and 67 carried by the frames 40 and 41. Coil springs (not shown) around the key stems normally hold the keys in undepressed positions.

Depression of a key 47 rocks a zero stop lever 68 out of the path of the usual reset spider 69 connected by a pin 74 to a bell crank 75, which with an arm 78 supports the usual latch 79. The bell crank 75 and arm 78 are mounted on a differential actuator 76 journalled on a bushing 70 extending between hangers 71 (only one shown) mounted on rods 72 and 73. The reset spider 69 is also journalled on the bushing 70.

A spring 80 holds the latch 79 in engagement with a shouldered segment 83 rocked clockwise and then counterclockwise, in each machine cycle, by a link 84, lever 85, pivoted at 86, rollers 87, 88 and cams 89 and 90. Therefore, the latch 79 rocks the actuator 76 clockwise until the bell crank 75 strikes the depressed key 47, which disengages the latch 79 from the segment 83 thus differentially positioning the actuator 76 in accordance with the key depressed. At the same time said latch 79 engages an aligning notch 94 of a stationary bar 95.

Such differential positioning of the actuator 76 is transmitted by the usual beam 96 and link 100 to an indicator segment (not shown) and to an arm 101 secured to the associated one of nested tubes 102 supported on a shaft 103 mounted in the machine side frames. This tube 102 is connected by a gearing, similar to that shown in Fig. 15, to a corresponding tube 104 (Figs. 23 and 25) on a shaft 105 carried by the printer framework. This tube 104 carries a corresponding amount type wheel 106.

After the actuator 76 has been set under control of the depressed key 47, a roller 107 on the lever 85 contacts and moves the beam 96 until said beam engages the hub 77, thus setting the indicator mechanism and corresponding type wheel 106 in accordance with the value of the depressed amount key. An aligner 109 then engages the corresponding indicator segment to retain the indicator and printer in set positions.

Three sets of teeth 110, 111 and 112 on the actuator cooperate respectively with the wheels 62, 63 and 64 of the three totalizer lines, and after the actuator 76 has been differentially set the selected totalizer wheels are engaged with their associated teeth 110, 111 and 112. Then upon counterclockwise movement of the driving segment 83, a shoulder thereon engages a stud 114 on the actuator 76 and rotates said actuator counterclockwise to normal position, thus adding the value of the depressed key into the engaged totalizers.

When there is an amount key 47 depressed the zero stop lever 68 stops the actuator 76 in zero position.

The several differential units are connected into one large unit by a tie rod 116 as shown in the Shipley Patent No. 1,619,796, which also shows and describes, completely, such an amount differential mechanism.

Transaction keys and differential mechanism

The transaction keys 48 to 55 inclusive (Figs. 1 and 10) are provided with a differential mechanism similar in many respects to the amount differential mechanism explained above, said differential mechanism being effective to position indicators and a printing wheel corresponding to the various transaction keys, also to control mechanism to determine the extent of feed for the ticket or slip to properly line space the items and totals printed thereon, and for selecting any one of the seven totalizers on the No. 3 totalizer line (Fig. 9) corresponding to said transaction keys, for engagement with the amount actuators.

The transaction keys 48 to 54 inclusive and the Ticket Number key 55 (Fig. 10) are depressibly supported in corresponding slots in a transaction key frame 117 supported by the rods 66 and 67 in the same manner as the amount bank 65. A compressible spring (not shown) is provided for each of the keys 48 to 55 inclusive, and said springs yieldingly urge said keys to and normally retains them in outward or undepressed positions, as shown here.

Depression of any one of the transaction keys, against the tension of its corresponding spring, moves the lower end of the stem thereof into the path of a bell crank 118 pivoted on a differential arm 119 having a hub 120 free on a bushing 121 supported between right and left transaction hangers 122 (only the left-hand hanger being shown here) in turn supported by the rods 72 and 73.

The bell crank 118 (Fig. 10) and an arm 123 on the arm 119 support a latch 124, and a spring 125 normally holds said latch in engagement with a drive segment 128 journalled on the bushing 121. The retaining rod 116 also passes through this bushing to form an assembly of all differential mechanisms.

In adding operations the segment 128 is rocked clockwise and then counterclockwise according to the time in space H, Fig. 26, by a link 129, lever 130, pivoted at 131, rollers 132—133 and cams 134 and 135 on the main shaft 46, whereupon the latch 124 rocks the differential arm 119 first clockwise until the bell crank 118 contacts the depressed transaction key 48 to 54, which disengages the latch 124 from the segment 128 and causes the latch 124 to engage the appropriate aligning notch 137 in a stationary plate 138, thus retaining the arm 119 in its differentially set position.

The differential positioning of the arm 119 is transmitted to the indicator and printing mechanisms, feed control mechanism and totalizer selecting means, by a beam 141 and link 144.

After the arm 119 has been set under control of a transaction key, a roller 152 on the lever 130 contacts and moves the beam 141 until it engages the hub 120, thus positioning the link 144 accordingly. Thus, a segment 145 and arm 146 connected to the link 144, are differentially positioned under control of the transaction keys 48 to 55.

The arm 146, through a gear sector 147, rack 148 and slide 149, differentially positions a totalizer selecting slide 150, which by its engagement with a shifting arm 151 differentially selects totalizers on line No. 3.

The arm 146 is connected by a tube 154 and gearing, similar to that shown in Fig. 15, to a type wheel 155 for symbol printing representative of the operated key 48 to 55.

The arm 146 through this tube 154 is also connected to means, to be later described, for controlling the feeding mechanism for the slip.

The Ticket Number key 55 has no totalizer associated therewith, but this key controls the differential for symbol printing, and indicating, when the latter are used.

Upon counter-clockwise movement of the segment 128 (Fig. 10) a shoulder thereon engages a stud 156 in the arm 119 and restores said arm and connected parts to their normal positions.

*Operators' keys and differential mechanism*

The operators' or clerks' keys 56 and the Auditor's Total key 58 (Figs. 1 and 15) are depressibly mounted in corresponding slots in a key frame 158, the lower end of which is supported by a stud 159 in the left frame 41, and the upper end of which is removably supported on the rod 66 in exactly the same manner as the transaction key frame 117 (Fig. 10). Each of the keys 56 and 58 is encircled by a compressible spring (not shown), which is tensioned to yieldingly maintain said keys upwardly in undepressed positions, as shown here.

Depression of any one of the keys 56 or 58 moves the lower end of the stem thereof into the path of a projection 160 on a differential lever 161 free on a stud 162 secured in the frame 41. The lever 161 is pivotally connected by a link 163 to a stud 164 in a latch lever 165 having an upward extension with a slot which engages a stud 166 in a differential latch 167 free on a stud in a plate 168 free on an indicator shaft 169 journaled in the machine framework. A spring 199, tensioned between an upward extension of the plate 168 and the stud 166, urges the latch 167 counter-clockwise to normally maintain a projection 170 thereon in engagement with a shoulder formed on a differential operating arm 171 free on the shaft 169. The arm 171 is integral with a crank 172 connected by a link 173 to a differential cam lever 174 (Figs. 15 and 16) free on a stud 175 in the left frame 41. The lever 174 carries a roller 176, which engages a camming groove 177 in a cam 178 secured on a shaft 179 journaled in the left side frame 41 and printer frame 43. The shaft 179 is connected by suitable gearing to the main cam shaft 46 and is driven thereby and in unison therewith one clockwise revolution, as viewed in Figs. 15 and 16, each adding operation, and two such revolutions in total and sub-total recording operations.

Revolution of the cam 178 rocks the lever 174 and, through the link 173, the crank 172 and the switch arm 171 first counter-clockwise and back to normal position in approximately the same timing as that shown in space H of the time chart (Fig. 26) for the transaction differential mechanism. Initial counter-clockwise movement of the arm 171, through the latch 167, carries the plate 168 and the lever 165 counter-clockwise in unison therewith, said lever, through the link 163, rocking the differential lever 161 clockwise.

Clockwise positioning movement of the differential lever 161 is terminated when the projection 160 thereof contacts the stem of the depressed operator's key 56 or the Auditor's Total key 58, to position said lever in accordance with said depressed key. The lever 161, through the link 163, also terminates movement of the lever 165, which, through the slot in its upper end, in cooperation with the stud 166, rocks the latch 167 clockwise to disengage the projection 170 thereon from the shoulder on the latch drive arm 171. Clockwise disengaging movement of the latch 167 simultaneously engages an angular alining tooth 182, formed thereon, with the corresponding one of a series of angular notches 183 in a bar 184 secured to a plate 185, in turn secured to the left frame 41, to position the operators' differential mechanism, including the differential plate 168, in accordance with the depressed key 56 or 58. As the operating arm 171 continues its counter-clockwise initial movement without interruption, a peripheral surface thereon, adjacent the shoulder, passes beneath the projection 170 of the latch 167 to secure the tooth 182 in the corresponding notch 183 while the differential positioning of the plate 168 is being transmitted to the operators' indicating, printing, and totalizer selecting mechanism.

The latch plate 168 carries a stud 186, to which is pivotally connected one end of a beam 187, the other end of which is slotted to receive a stud in a crank 188 secured on the shaft 169. A link 189 pivotally connects the crank 188 to a printer positioning segment 190 free on the stud 162, said segment having teeth in its upper end which mesh with and drive a printer gear wheel (not shown), which is connected by a corresponding one of the tubes 104 (Fig. 23) to an operator's type wheel 191.

After the plate 168 (Fig. 15) has been positioned under influence of the depressed key 56 or 58, as explained above, and near the end of the initial counter-clockwise movement of the lever 174, a roller 192, carried by said lever 174, engages an outcurved surface 193 on the beam 187 and forces an incurved surface on said beam into contact with a hub on the shaft 169 to position said beam 187 and, through the link 189, the printer segment 190 and the operator's type wheel 191 in accordance with the depressed key 56 or 58.

The beam 187, in addition to positioning the segment 190, also, through the crank 188, positions the indicator shaft 169 in accordance with the depressed key 56 or 58, and this positioning of said shaft 169 (Fig. 9) is transmitted, by a gear segment 194 secured thereon, to a rack 195 and a slide 196 integral with said rack. The slide 196 is mounted for vertical shifting movement by means of alined slots therein, in cooperation with rollers rotatable on studs in bent-over ears formed on a bracket 197 secured to the machine back plate 44. The slide 196 carries a roller 198, which engages a cam slot in a plate 199 mounted for horizontal shifting movement on the machine back plate and carrying a bracket 200 having therein a slot which engages a downward extension of a totalizer shifting arm 201.

The differential positioning of the shaft 169 is transmitted through the segment 194 to the slide 196 and from said slide 196 to the plate 199 and thence, through the arm 201, to the No. 2 totalizer shaft to position said shaft laterally to aline the set of wheels 63 thereon corresponding to the depressed key 56 or 58 with the amount actuators 76.

After the set of wheels on the No. 2 totalizer line corresponding to the depressed key 56 or 58 has been alined with the amount actuators, and after said actuators have been positioned in adding operations by the depressed amount keys 47, the No. 2 totalizer line is shifted inwardly to engage the selected set of wheels 63 with the corresponding teeth 111 in the amount actuators. Return counter-clockwise movement of said actuators rotates the selected set of wheels 63 in an additive direction to enter therein the value of the depressed amount keys 47. After the amount actuators have completed their return movements, the No. 2 totalizer shaft is shifted outwardly to disengage the selected set of wheels 63 from said actuators.

Return clockwise movement of the lever 174 (Figs. 15 and 16), under influence of the cam 178 and through the link 173, simultaneously returns the crank 172 and the arm 171 also clockwise to withdraw the peripheral surface on said arm from the projection 170, whereupon the spring 180, assisted by the camming action of the angular alining notch 183 and the angular tooth 182, restores the latch 167 counterclockwise to again engage said projection 170 with the shoulder on said arm 171. Simultaneously, a projecting finger on the arm 171 engages a stud 202 in the plate 168 to return said plate and, through the latch 167, the lever 165, the link 163, and the differential lever 161 from set position to normal position, as shown here. In this case, as is true with the amount and transaction differential mechanisms described above, the beam 187 permits the shaft 169, the segment 190, and their corresponding indicating, totalizer selecting, and printing mechanisms to remain in set positions at the end of machine operation, and said parts are moved directly from their old positions to their new positions in the succeeding machine operation without having to return to a neutral position.

Also secured on the shaft 169 (Fig. 9) is an indicator segment 203 for the keys 56 and 58 (Fig. 15), which selects the indicators corresponding to these keys for movement to viewing position. Also secured on the shaft 169 is an alining segment 204, the teeth of which are engaged by the aliner 109 to aline the shaft 169 and the parts connected thereto in set positions.

The foregoing somewhat brief description of the operators' differential mechanism and the mechanisms operated thereby for selecting the corresponding sets of totalizer wheels on the No. 2 totalizer line for engagement with the amount actuators and for selecting the corresponding indicators and the corresponding type wheel is believed sufficient for the purpose of this application. However, if a more detailed description of this mechanism is desired, reference may be had to United States Patent No. 2,238,517, issued April 15, 1941, to Arthur R. Colley et al., from which a complete disclosure of the above mechanism may be had.

*Totalizer engaging mechanism*

The mechanism for controlling the engaging and disengaging movement of the No. 2 totalizer line has been shown in a general way in Fig. 17 and will be briefly described hereinafter. This is believed sufficient, as a full and detailed description of the totalizer engaging mechanism may be had by referring to the Shipley Patent No. 1,817,883, referred to hereinbefore.

The No. 2 totalizer line (Figs. 9 and 17), together with the right and left arms 201 and a shaft 229, form a framework supported between the main frames 40 and 41 for longitudinal shifting movement to select the various sets of No. 2 totalizers for engagement with the amount actuators, and said framework is also mounted for in-and-out shifting movement to engage and disengage the selected totalizer with and from the amount actuators.

Rollers 205 on the shaft 229 cooperate with guide slots in cam plates 206 and rollers 209 on cranks 207 engage cam slots 210 of said plates 206. A totalizer engaging arm 211, secured to the shaft 229, has pivoted thereto a link 212 having a stud 213 engageable with a hook 214 of the usual totalizer engaging spider 215 pivoted on a stud 216.

This spider 215 has a stud 217 engaged by a notch 218 of a link 219 moved back and forth, by a lever 220, pivoted at 221, rollers 222—223 and cams 224 and 225 on the main drive shaft 46 according to the timing in space J (Fig. 26), whereupon the spider 215 is rocked clockwise to engage the totalizer with the actuator and counter clockwise to effect disengagement of the totalizer.

The link 219 has a slot 226 engaging a roller 227 of a control lever 228, which is similar to and functions like the corresponding lever of the Shipley Patent 1,817,883 to control the coupling of the link 219 with the spider 215.

In adding operations, it is compulsory to depress an operator's key 56 to select a totalizer on line No. 2 to register therein the amounts printed on the ticket (Fig. 2).

With the total lever 61 in adding position (Figs. 1 and 17) the spider 215, operated by the link 219 engages the selected totalizer, by the means above described, with the actuators 76 to register into such totalizer the amounts printed on the ticket.

In reading and resetting operations, the different sets of totalizer wheels 63 on the No. 2 totalizer line are selected by depression of the keys 56 and 58, the same as in adding operations. However, in reading and resetting operations, engaging and disengaging movement of the No. 2 totalizer line and the connection of said totalizer line to the engaging spider 215 are controlled by the total control lever 61.

In reading operations, upward movement of the total control lever 61 (Figs. 1 and 17) from adding position to No. 2 reading position causes the stud 213 (Fig. 17) in the engaging link 212 to be engaged with the hook 214 in the engaging spider 215. Likewise, movement of the total control lever 61 (Fig. 17), through the lever 228 and a zero throwout shaft 230 (Figs. 10 and 21) controls the engagement of the notch 218 in the link 219 with the stud 217 to cause the No. 2 totalizer line to be engaged and disengaged in reading time.

It will be recalled that reading and resetting operations require two clockwise rotations or two cycles of movement of the main cam shaft 46, instead of the one rotation of said shaft required for adding operations. The first rotation of the main shaft 46 in reading and resetting operations is required to shift the selected totalizer line laterally to select the proper set of totalizer wheels thereon for engagement with the amount actuators, and is also required to render the mechanism effective which causes the positioning of the amount actuators to be controlled by the long teeth on the selected set of totalizer wheels.

During the first cycle or revolution of the main cam shaft 46 (Fig. 9), it is necessary to disengage the latches 79 from the drive segments 83 of the amount differential mechanisms in zero positions, and this is done by the zero stop levers 68. However, during the second revolution of said cam shaft, it is necessary to rock the zero stop levers 68 counter-clockwise out of the paths of the forward extensions of the spiders 69, so that the differential actuators 76 may be positioned under influence of the selected set of totalizer wheels.

The rocking of the zero stop levers 68 to ineffective positions during the second cycle or second revolution of the main cam shaft 46 is effected by the zero throwout shaft 230, which has secured thereon a plurality of cranks 231 supporting rods 232 arranged to engage forward extensions 233 secured to the zero stop levers 68. Manual movement of the total control lever 61 (Figs. 1 and 17) to No. 2 reading position, through the well-known mechanism not shown here but fully disclosed in the above-referred-to Shipley patents, rocks the zero throwout shaft 230 (Fig. 9) a slight distance clockwise, but not sufficiently to cause the rod 232 to engage the extensions 233 of the zero stop lever 68 for the amount bank shown in Fig. 9, which, it will be recalled, is being used here as representative of all of the amount banks.

Near the end of the first cycle of the reading operation, or near the end of the first revolution of the main cam shaft 46, mechanism, rendered effective by movement of the total control lever out of adding position, rocks the zero throwout shaft 230 an additional distance clockwise, causing the rod 232, in cooperation with the extension 233, to rock the zero stop lever 68 counterclockwise out of the path of the forward extension of the reset spider 69, so that the differential actuator 76 will be free to move clockwise to be positioned under influence of the corresponding totalizer wheel of the selected set of totalizer wheels. The timing of the movement of the zero throwout shaft 230 is given in space I of the time chart, Fig. 26.

In reading operations, the selected set of wheels 63 on the No. 2 totalizer line (Fig. 9) is engaged with the amount actuators 76 prior to initial clockwise movement of said actuators in the second cycle of such operation, which initial movement rotates said selected set of wheels in a direction reverse to adding direction.

Movement of the total control lever to No. 2 reading position renders mechanism effective which causes the differential positioning mechanism to be moved into the path of the long teeth of the selected set of totalizer wheels 63, so that arrival of the corresponding one of said selected wheels at zero position, while being rotated in a reverse direction, causes the long tooth thereon, in cooperation with said differential positioning mechanism, to obstruct further clockwise movement of the reset spider 69 in the well-known manner. This causes the notch in the forward extension of said spider, in cooperation with the stud 74 in the forward extension of the bell crank 75, to disengage the foot-shaped extension 81 of the latch 79 from the shoulder 82 of the drive segment 83, to position the actuator 76 and the corresponding indicator and printing mechanisms in accordance with the amount standing on said corresponding totalizer wheel 63.

After the impression mechanism has functioned to record the amount of the sub-total upon the record material, the actuator 76 (Fig. 9) is restored counterclockwise to normal or home position in the manner explained in connection with adding operations, and during this restoring movement the corresponding wheel 63 of the selected totalizer on the No. 2 totalizer line remains in engagement with the teeth 111 on said actuator 76, and, as a result, said wheel is restored to its original position.

A resetting or totalizing operation, in connection with the totalizers on the No. 2 totalizer line, is effected by movement of the total control lever 61 (Figs. 1 and 17) counter-clockwise or downwardly to No. 2 resetting position. This movement of the total control lever, through the lever 228 and the roller 227, in cooperation with the slot 226, rocks the link 219 counter-clockwise to disengage the notch 218 from the stud 217. As a result, initial movement of the lever 220, by the cams 224 and 225, shifts the link 219 rearwardly without imparting any movement to the engaging spider 215. This rearward idle movement of the engaging link 219 alines a notch 234 in the lower edge thereof with a stud 235 in the reset spider 215. Prior to return forward movement of the link 219 near the end of the first cycle or first revolution of the main shaft 46, the clockwise movement imparted mechanically to the zero throwout shaft 230 (Figs. 9 and 21 and space I, Fig. 26) rocks the lever 228 (Fig. 17) an additional distance clockwise, causing the roller 227, in cooperation with the slot 226, to engage the notch 234 with the stud 235. Immediately thereafter, return movement of the lever 220 and the link 219 rocks the engaging spider 215 clockwise to engage the selected set of wheels on the No. 2 totalizer line with the amount actuators.

As in reading operations, in the first part of the second cycle or second revolution of the main shaft 46, the selected set of wheels on the No. 2 totalizer line is rotated in a reverse direction to zero to position the amount actuators in accordance with the amount standing thereon. While said selected set of totalizer wheels in standing at zero, initial movement of the main shaft 46 and the cams 224 and 225, in the second cycle or second clockwise revolution of said shaft 46, shifts the link 219 rearwardly, causing the slot 234, in cooperation with the stud 235, to return the engaging spider 215 counter-clockwise to disengage the selected set of wheels on the No. 2 totalizer line from the amount actuators, thereby leaving said wheels in a zeroized condition.

The timing of the engaging and disengaging movement of the selected set of totalizer wheels with and from the amount actuators constitutes the only difference between a reading operation and a resetting operation.

As explained previously, the item or transaction keys 48 to 54 inclusive (Figs. 1 and 10), through their differential mechanisms, control the selection of the corresponding sets of totalizer wheels on the No. 3 totalizer line for alinement with the amount actuators 76 in adding, reading, and resetting operations. Likewise, said item keys, through their corresponding selecting disks, cause engaging and disengaging movement to be imparted to the No. 3 totalizer line in adding operations.

Movement of the total control lever 61 (Fig. 17) from adding position to No. 3 reading position causes the set of totalizer wheels on the No. 3 totalizer line corresponding to the depressed selecting keys 48 to 54 inclusive to be engaged with and disengaged from the amount actuators in reading time, in exactly the same manner and by means of similar mechanism to that described in connection with the No. 2 totalizer line. Likewise, movement of the total control lever 61 from adding position to No. 3 resetting position causes the set of totalizer wheels on the No. 3 totalizer line corresponding to the depressed item keys 48 to 54 inclusive to be engaged with and disengaged from the amount actuators in resetting time in exactly the same manner as explained in connection with the No. 2 totalizer line.

In addition to selecting the different sets of totalizer wheels on the No. 3 totalizer line, the item keys 48 to 54 inclusive likewise control a selecting disk for the No. 1 or item totalizer line to cause the single set of wheels thereon to be engaged with and disengaged from the amount actuators 76 (Fig. 9) in adding operations, so that the amounts of all items corresponding to the item keys 48 to 54 inclusive will be accumulated in the No. 1 or item totalizer. Movement of the total control lever from adding position to No. 1 reading position causes the No. 1 or item totalizer to be read, and movement of said total control lever to No. 1 resetting position causes said totalizer to be reset, in exactly the same manner as explained in connection with the No. 2 totalizer line.

Control of transaction differential by total control lever

A zero stop pawl, controlled by the total control lever, is provided for the transaction differential mechanism and is effective, when the total control lever is moved to No. 1 or No. 2 reading position and/or No. 1 and No. 2 resetting position, to disengage the latch mechanism for the transaction differential in zero position, so that in these operations none of the totalizers on the No. 3 totalizer line will be selected.

Directing attention to Figs. 10 and 17, free on the rod 72 is a transaction zero stop pawl 236 having integral therewith an arm 237, both of said parts being urged clockwise by a spring 238 to normally maintain a stud 239, carried by said arm 237, in contact with a camming surface 240 on a plate 241 secured to the disk portion of the total control lever 61.

When the total control lever 61 is in adding position, as shown in Fig. 17, and when said total control lever is in No. 3 reading position or No. 3 resetting position, high portions of the camming surface 240 maintain the zero stop pawl 236 in ineffective position, as shown here, in which position a stop surface 242 thereon (Fig. 10) is out of the path of a forward extension of a latch control arm 243 free on the bushing 121. Like the reset spider 69 (Fig. 9) for the amount differential mechanism, the latch arm 243 has therein a slot which engages a stud 244 in the forward extension of the bell crank 118.

Movement of the total control lever 61 (Figs. 10 and 17) to No. 1 or No. 2 reading position, or to No. 1 or No. 2 resetting position, moves the low portion of the camming surface 240 opposite the stud 239, permitting the spring 238 to rock the arm 237 and the stop pawl 236 clockwise to move the surface 242 into the path of the forward extension of the arm 243. Initial clockwise movement of the transaction differential mechanism causes the forward extension of the arm 243 to engage the surface 242 to obstruct further clockwise movement of said arm, whereupon the slot therein, in cooperation with the stud 244, rocks the bell crank 118 and the arm 123 counterclockwise to shift the latch 124 forwardly out of engagement with the shoulder 127 on the drive segment 128, to position the transaction differential mechanism at zero.

From the foregoing description it is obvious that, when the item totalizer on the No. 1 totalizer line is being read or reset, or any of the totalizers on the No. 2 or operator's totalizer line is being read or seset, the differential mechanism for the transaction keys 48 to 55 inclusive is positioned at zero.

In total and sub-total recording operations involving the totalizers on the No. 2 line, it is necessary to use the regular starting bar 60 (Fig. 1) in connection with the keys 56 and 58 to initiate machine operation. However, in such operations involving the totalizers on the No. 3 line, this is not necessary, as it will be recalled that depression of the keys 48 to 54 inclusive and also the Ticket Number key 55 initiates machine operation.

Item total operations

Mechanism controlled by the item or transaction keys 48 to 54 inclusive (Fig. 10) is provided for locking the total control lever 61 (Fig. 17) against movement to other than No. 1 Read or item sub-total position, or No. 1 Reset or item total position. This same mechanism under control of the total control lever also operates to lock the keys 51 and 52 against depression after any one of the keys 48, 49, 50, or 55 has been depressed, and said mechanism remains effective until after an item total operation has been performed. Likewise, the above mechanism functions to lock the keys 48, 49, 50, and 55 against depression after either of the keys 51 or 52 has been depressed, said mechanism remaining effective until an item total operation is performed.

Directing attention to Fig. 10, depression of either of the keys 51 or 52 causes a corresponding stud 245 carried thereby, in cooperation with a corresponding angular camming surface 246 on a control plate 247 mounted on the key frame 117 for oscillatory movement by means of slots therein, in cooperation with studs in said frame, to shift said control plate 247 clockwise or rearwardly against the action of a spring 248. Rearward shifting movement of the control plate 247 moves stop surfaces 258 on projections thereon, beneath corresponding studs 259 in the keys 48, 49, 50, and 55, to lock said keys against depression after one of the keys 51 or 52 has been depressed.

Likewise, depression of any one of the keys 48, 49, 50, or 55 moves the stud 259 therein into the path of rearward surfaces 260 on the projections on the plate 247, to obstruct rearward or clockwise movement of said plate, thereby, through the angular camming surfaces 246, in cooperation with the studs 245, locking the keys 51 and 52 against depression.

An extreme downward extension of the control plate 247 (Fig. 10) carries a stud 249, which cooperates with a latching extension 250 of a yoke 262 free on the zero throwout shaft 230, said yoke 262 having integral therewith an arm 251 having secured thereto a finger 261. An incurved surface on the rearward end of the finger 261 underlies the stud 244 in the bell crank 118, and a spring (not shown) urges said finger and the arm 251 and the extension 250 of the yoke counter-clockwise to normally maintain said finger 261 in yielding engagement with said stud 244. The arm 251 has an offset extension which carries at its extreme upper end a roller 252, which engages a camming slot 253 in an arm 254 pivotally supported by a stud 255 in the right-hand hanger 122 for the transaction bank. The arm 254 (Figs. 10 and 17) carries a flattened stud 256, which cooperates with a locking notch 257 in the plate 241, which, as explained previously, is secured to the disk portion of the total control lever 61.

Depression of any one of the keys 48, 49, 50, or 55, as explained previously, moves the corresponding stud 259, carried thereby, into the path of the corresponding locking surface 260 of the control plate 247 to obstruct clockwise movement of said plate and thus lock the keys 51 and 52 against depression by securing said control plate 247 against clockwise movement. This retains the stud 249 in the lower end of said control plate 247 in its downward position beneath the bottom surface of the extension 250, and, as a result, clockwise movement of the transaction differential mechanism, upon operation of the machine, withdraws the stud 244 from the finger 261, permitting the arm 251 and the extension 250 to rock counter-clockwise, under influence of the spring, to move the extension 250 over the stud 249. Counter-clockwise movement of the arm 251, under influence of its spring, also causes the roller 252 (Figs. 10 and 17), in cooperation with the slot 253, to rock the arm 254 clockwise to move the stud 256 into the notch 257 to limit the movement of the total control lever 61 to No. 1 Read and/or No. 1 Reset positions. A slot 279 in the arm 254 permits movement of the total lever 61 to the No. 1 Read position. The finger 261 (Fig. 10), in its counter-clockwise movement, moves out of the path of the stud 244 and remains out of the path of said stud, so that said finger and the arm 251 will not be restored clockwise upon return movement of the transaction differential mechanism. Movement of the extension 250 (Fig. 10) over the stud 249 locks the control plate 247 against upward movement in this case and retains said control plate thus locked until an item total operation is performed. Therefore it is impossible to depress the keys 51 and 52 until the multiple-item transaction is completed by the taking of an item total.

As explained previously, movement of the total control lever 61 (Fig. 17) to No. 1 resetting or item total position imparts a slight clockwise movement to the zero throwout shaft 230, and, by referring to space I of the time chart (Fig. 26), it will be recalled that, near the end of the first cycle of item total operations (or any other total or sub-total operations, for that matter), additional clockwise movement is imparted to the zero throwout shaft 230. This mechanical clockwise movement of the zero throwout shaft near the end of the first cycle of item total operations causes an arm supported thereby (not shown), in cooperation with a stud in the yoke 262 (Fig. 10), to restore said yoke, the arm 251, and the finger 261 counter-clockwise to move the rearward tip of said finger back into the path of the stud 244. It will be observed, from a comparison of spaces H and I of the time chart (Fig. 26), that the clockwise restoration of the finger 261 occurs after the transaction differential mechanism has completed its initial clockwise movement, whereupon return movement of said differential mechanism causes the stud 244 to engage the tip of the finger 261 to fully restore said finger, the arm 251, and the yoke 262 clockwise to normal positions, as shown in Fig. 10.

The mechanism just described for locking the total control lever against movement to positions other than the item total position in multiple item transactions is disclosed in the United States Patent No. 1,761,644, issued June 3, 1930, to Bernis M. Shipley.

Mechanism is provided for preventing restoration of the finger 261 and the arm 251 in item sub-total operations, as it is desirable that this mechanism remain effective to retain the keys 51 and 52 against depression until the item totalizer has been cleared by the performance of an item total operation.

Movement of the total control lever 61 upwardly to No. 1 Read or item sub-total position causes the bottom of the notch 257 (Figs. 10 and 17) in the plate 241, in cooperation with the stud 256, to shift the arm 254 upwardly, the slot 279 permitting such movement of the arm 254, to move the slot 253 out of the path of the roller 252 and to move a stop surface 299 on said arm 254 opposite said roller 252 to obstruct return clockwise movement of the arm 251 and connected parts, under influence of the clockwise movement of the zero throwout shaft 230, to retain the extension 250 over the stud 249 to block clockwise or upward movement of the control plate 247 and thus retain the keys 51 and 52 against depression until an item total operation has been performed.

*Automatic total transfer mechanism*

It will be recalled that movement of the total control lever to No. 1 Reset or item total position causes the single set of wheels on the No. 1 totalizer line to be cleared and the amount therein automatically transferred to the set of wheels on the No. 2 totalizer line corresponding to the Auditor's Total key 58 (Fig. 1).

Counter-clockwise movement of the total control lever 61 (Fig. 17) from adding position to No. 1 resetting or item total position moves a stud 263, carried thereby, into alinement with the central portion of a V-shaped notch 264 in an arcuate surface 265 on a lever 266 free on a stud 267 in the right frame 40. This permits a spring 268 to yieldingly urge the lever 266 counter-clockwise as said stud 263 moves into alinement with the central portion of said notch 264. Counterclockwise movement of the lever 266 is transmitted through a link 269 to a yoke 270 free on a stud 271 in the right frame 40. The left arm of the yoke 270 has an upward extension 272 (Figs. 15 and 17) carrying a stud 273, which engages a slot in a downwardly extending arm of a yoke 274, which extends substantially the full width of the machine and is rotatably supported by a rod 275 in turn supported by the main frames 40 and 41. Counter-clockwise movement of the yoke 270, as viewed in Fig. 17, and clockwise movement of said yoke as viewed in Fig. 15, through the stud 273, rocks the yoke 274 counter-clockwise to move a shoulder 276, formed on a plate 277 adjustably connected to the left arm of said yoke, beneath an extension 278 of the link 163 for the operators' differential mechanism.

Upon operation of the machine to clear or reset the item totalizer, the shoulder 276, in cooperation with the extension 278, obstructs initial movement of and positions the operators' latch mechanism exactly the same as if the Auditor's Total key 58 were depressed, and therefore, through the mechanisms shown in Figs. 9 and 15, selects the set of wheels on the No. 2 totalizer line corresponding to the Auditor's Total key 58 for engagement with the amount actuators 76.

Counter-clockwise movement of the yoke 270 (Figs. 17, 18, 19, and 20) shifts the link 280 downwardly to rock a lever 281 clockwise, whereupon a notch 283, engaging one end of a stud 284, shifts an arm 285 downwardly against the tension of a spring 288, to disengage the left-hand extension of said stud 284 from the notch in the periphery of the arm 211 and to simultaneously engage said left-hand extension of the stud 284 with a notch 289 in a block 290 secured on an arm 291 free on the No. 2 totalizer engaging shaft 229. The arm 291 (Figs. 17 and 19) is connected by a link 292 to an arm 293 free on the rod 73 and having a notch which engages a stud 294 in a crank 295 integral with a cam plate 297 free on a stud 296 in the right frame 40. The plate 297 has a cam slot 298 engaged by a roller 300 carried by the cam lever 220.

Initial clockwise movement of the lever 220, through the roller 300, in cooperation with the slot 298, rocks the plate 297 and the crank 295 also clockwise. Clockwise movement of the crank 295, through the stud 294, rocks the arm 293 counter-clockwise, which, through the link 292, also rocks the arm 291 counter-clockwise. Counter-clockwise movement of the arm 291, through the notch 289 in cooperation with the stud 284, rocks the arm 287, the crank 207, and the No. 2 totalizer engaging shaft 229 also counter-clockwise to engage the auditor's set of totalizer wheels on the No. 2 totalizer line with the amount actuators 76 in add timing.

After the amount of the item total has been transferred from the item totalizer to the auditor's totalizer on the No. 2 totalizer line, return counter-clockwise movement of the lever 220, returns the crank 207 and the shaft 229 clockwise to disengage the auditor's set of totalizer wheels on the No. 2 totalizer line from the amount actuators 76. During engaging and disengaging movement of the arm 291 (Fig. 19), the stud 284 passes beneath a circumferential surface 301 on the periphery of the arm 211 to secure said stud in the notch 289. Return clockwise movement of the arm 287 (Figs. 19 and 20) causes a stud 302, carried thereby, to engage a shoulder formed on the arm 211 to insure that the notch in the segmental portion of said arm 211 is alined with the stud 284 when the machine is in home position, so that, upon movement of the total control lever 61 from item total position to any other position, said stud 284 will again engage said notch to connect the No. 2 totalizer line to the regular engaging and disengaging mechanism.

Movement of the total control lever 61 (Fig. 15) to No. 2 Reset position, through the train of mechanism comprising the link 303, the crank 304, the shaft 103, the segment 305, the sector 306, the shaft 307, and the segment 308, positions a type wheel setting gear 309 and the plate 310, carried thereby, so that a notch 319, formed in the control surface of said plate 310, is opposite the roller 312. Inasmuch as the spring 318 is strong enough to overcome the action of the spring 315, the lever 313 remains in the position shown here when the notch 319 is moved opposite the roller 312. Normally, with the total control lever in No. 2 Reset position, depression of the Auditor's Total key 58 (Figs. 1 and 15) causes a stud 320, carried thereby, in cooperation with a camming surface 321 on the control plate 317, to shift said plate clockwise or forwardly against the action of the spring 318. This withdraws the shoulder on said plate from the stud 316 to release the lever 313 to the action of the spring 315, which immediately rocks said lever clockwise until the roller 312 bottoms in the notch 319. Clockwise movement of the lever 313 carries a rearward extension 322 thereof into the path of a shoulder 323 formed on an arm 324 secured on the key lock shaft 325, which is journaled in the main frames 40 and 41. This obstructs counter-clockwise releasing movement of the key lock shaft 325, and, as this movement is necessary to render the clutch mechanism effective which connects the electric operating motor to the machine mechanism and simultaneously closes the electric energizing switch for said motor, it is therefore evident that movement of the control plate 317 (Fig. 15), when the Auditor's Total key 58 is depressed, moves locking projections 326 on said plate beneath corresponding studs 327 in each of the keys 56 to lock said keys against depression.

Inasmuch as it is necessary to depress the Auditor's Total key 58 in order to reset the auditor's totalizer on the No. 2 totalizer line, it is obvious that, under normal conditions, the lever 313, in blocking the key lock shaft 325 against releasing movement, prevents such resetting of the said auditor's totalizer. However, the possessor of the key to the lock 59 (Fig. 1) for the auditor's totalizer may operate said lock 59 to lock the lever 313 in the position shown in Fig. 15, in which position the extension 322 is retained out of the path of the shoulder 323, so that depression of the Auditor's Total key 58 will not interfere with operation of the machine, thereby permitting the resetting of the auditor's totalizer. Depression of any one of said keys 56 moves the corresponding stud 327 therein into the path of a corresponding blocking surface formed by the projections 326 to block clockwise movement of said plate, thereby causing the camming surface 321, in cooperation with the stud 320, to lock the Auditor's Total key 58 against depression.

When the total control lever 61 (Figs. 1 and 15) is in positions other than No. 2 Reset and No. 1 Read, the control surface on the plate 310, in cooperation with the roller 312, holds the lever 313 in the position shown here, so as not to interfere with releasing counter-clockwise movement of the key lock shaft 325.

In reading and resetting operations of the seven sets of totalizers of the No. 3 totalizer line, in which operations none of the operators' keys 56 is depressed, the operators' differential mechanism (Fig. 15), including the lever 161, is free to move full distance until a stop surface 329 thereon contacts a stationary stud 330 to position the No. 2 totalizer line in neutral position, in which none of the sets of totalizer wheels thereon is in alinement with the amount actuators 76.

The gear 309 (Fig. 15) is also connected to and positions a printing wheel (Figs. 15 and 23) similar to the amount printing wheel 106 for recording upon the record material a symbol characteristic of the type of operation being performed. Generally, when the total control lever 61 is in adding position, the type wheel therefor is positioned to print a number which identifies the particular machine. When the total control lever is in No. 1 Reset position, the corresponding type wheel is positioned to print a star to identify this type of operation. When the total control lever is in No. 2 or No. 3 Reset position, the type wheel is positioned to print, respectively, a 2—Z and a 3—Z to identify these operations. When the total control lever is in No. 1 Read position, an S is printed to identify this as a sub-total operation involving the No. 1 or item totalizer. Likewise, when the total control lever is in No. 2 or No. 3 Read position, the type wheel is positioned to record, respectively, a 2—X and a 3—X to identify these reading operations.

In connection with the automatic transfer of totals from the No. 1 or item totalizer to the auditor's totalizer on the No. 2 totalizer line, as explained above, it will be observed (Fig. 17) that, when the total control lever 61 is in any position other than No. 1 Reset or item total position, the stud 263, in cooperation with the arcuate surface 265 on the lever 266, retains said lever and the parts connected thereto in the positions shown here, in which the shoulder 276 (Fig. 15) of the plate 277 is held out of the path of the extension 278 of the link 263, and in which the stud 284 is retained in its upward position, as shown in Figs. 17, 19, and 20, in which said stud is in engagement with the notch in the periphery of the arm 211, to render the automatic total transferring mechanism ineffective and to permit the No. 2 totalizer line to be selected for engagement in the normal manner.

From the foregoing description, it is obvious that, when the total control lever 61 is in No. 2 Reset position, any of the sets of totalizers on the No. 2 totalizer line corresponding to the operators' keys 56 (Figs. 1 and 15) may be reset. However, normally the set of totalizer wheels on the No. 2 totalizer line corresponding to the Auditor's Total key 58 may not be reset, due to the movement of the lever 313 into position to block counter-clockwise releasing movement of the key lock shaft 325. However, manipulation of the lock 59 by the possessor of the key thereto locks said lever 313 in ineffective position, as shown in Fig. 15, so that the auditor's totalizer may be reset. When the total control lever 61 is moved to No. 2 reading position, the lever 313 is retained in ineffective position by the control surface on the control plate 310, so that any of the sets of totalizer wheels corresponding to the operators' keys 56 or the set of totalizer wheels corresponding to the Auditor's Total key 58 may be read.

The keys 56 or 58 may be manually released (Fig. 1) by the manipulation of a finger piece 331, which extends upwardly through an opening in the keyboard top plate. This finger piece 331 is connected to and operates the flexible detent which, when shifted upwardly, as viewed here, releases any depressed key.

Printing mechanism

As explained previously, there is a printing wheel 106 (Figs. 23 and 25) for each row of amount keys 47, a printing wheel 155 for the item keys 48 to 54 inclusive and for the Ticket Number key 55, and a printing wheel 191 for the operators' keys 56 and the auditor's key 58, said type wheels being positioned by their corresponding differential mechanisms in accordance with the corresponding depressed key. There is also a printing wheel (not shown) for the total control lever 61 and positioned thereby, which is similar in every respect to the type wheels 106, 155, and 191.

Each of the type printing wheels 106, 155, and 191 has two sets of printing characters thereon, an upper set for making recordings upon the lower surface of an audit strip 333 (Fig. 23) and a lower set of characters for making similar recordings upon the upper surface of an insertable ticket or slip 334 (Fig. 2). The audit strip 333 is unwound from a supply roll (not shown) and threaded around various guide studs, thence between the type wheels 106, 155, and 191 and a platen 335 of an audit strip printing hammer 336, and finally onto a take-up or feeding roll (not shown), which is rotated one step each machine operation, in the well-known manner, to line-space said audit strip. The audit strip carries a recording of every entry made in the machine, and it is usually the practice to remove a section of this audit strip 333 covering a certain period of time for the purpose of checking and proving accounts.

The insertable ticket 334 (Figs. 2 and 23), upon which it is desirable to print various data, is placed upon the top surface of a slip table 337 secured to the printer framework, between the feeding and pressure rolls and between the printing wheels 106, 155, and 191 and a platen 338 of an item hammer 339 and the platen 340 of a consecutive number and date hammer 341 (Fig. 25). The ticket 334 (Figs. 2 and 23) has printed thereon a line which, when placed in coincidence with a line 342 engraved in the top of the table 337, properly locates said ticket to receive the first recording.

The hammers 339 and 341 (Figs. 23 and 25) are rotatably mounted on a rod 343 supported by the left frame 41, the printer frame 43, and a printer sub frame (not shown). The item hammer 339 carries a stud 344, which cooperates with a forward extension of a hammer operating arm 345 free on the rod 343. A comparatively strong spring 346, tensioned between the arm 345 and a stationary stud, urges said arm and, through the stud 344, the hammer 339 clockwise to normally maintain a shoulder 347, formed on said rearward extension, in yielding engagement with a projection on the bail of a yoke 348 also rotatably supported by the rod 343. The yoke 348 is secured to a cam lever 349, free on the rod 343 and having a rearward extension 350, which cooperates with an eccentric bushing 351 adjustably supported by a rod 352, in turn supported by the frames 41 and 43. The spring 346, through the shoulder 347, urges the bail 348 and the cam lever 349 clockwise to normally maintain the lower surface on the extension 350 in yielding contact with the eccentric bushing 351.

A downward hook-shaped extension of the cam lever 349 (Fig. 23) has a cam surface 354, which cooperates with nodes 355 and 356 on a hammer operating cam 357 secured on a shaft 358 journaled in the frames 41 and 43 and the printer sub frame, which shaft makes one clockwise revolution, as viewed in Fig. 23, each adding operation and two such revolutions in sub-total and total recording operations. A comparatively weak spring 353 (Fig. 23) is tensioned between a downward extension of the hammer operating arm 345 and the hammer 339 which spring 353 normally tends to move the stud 344 in yieldable contact with the forward extension of said arm 345 but the stud 344 is normally held slightly above the arm 345 by means later to be described.

Mechanism which is effective when the hammer 339 is in normal position, as shown in Fig. 23, is provided for rocking said hammer a slight distance clockwise against the tension of the spring 353 to lift and hold the stud 344 away from the forward extension of the arm 345. This slight clockwise movement of the hammer 339 permits certain mechanisms which control the printing stroke of said hammer, as will be explained later, to be moved into the paths of corresponding blocking means without interference therewith.

A rearward extension of the item hammer 339 (Figs. 22 and 23) carries a stud 359, engaged by a hook 360 free on the rod 352 and having a downward extension which is slotted to embrace the bail of a yoke 361 also free on said rod 352. This hook 360 is the means for holding the stud 344 normally away from the hammer operating arm 345. The yoke 361 carries a stud 362, which engages a slot in a rearward extension of a pitman 363 mounted for horizontal shifting movement by means of slots therein which freely engage the shaft 358 and a stud 364 secured in the frame 43. The pitman 363 has rotatably mounted thereon an arm 365 urged counter-clockwise by a comparatively strong spring 366 to normally maintain a roller 367 carried thereby in yielding contact with the periphery of a plate cam 368 secured on the shaft 358. The pitman 363 also carries a roller 369, which cooperates with the periphery of a plate cam 370, similar in outline to the cam 368 and also secured on the shaft 358.

The pitman 363 (Figs. 22 and 23) shifts first toward the right and then back to normal position under influence of the cams 368 and 370 according to the time given in space F of the chart (Fig. 26). Initial movement toward the right of the pitman 363 (Figs. 22 and 23), through the slot in the rearward extension thereof, in cooperation with the stud 362, rocks the yoke 361 and the hook 360 clockwise to disengage said hook from the stud 359. This permits the hammer 339 to return a slight distance counter-clockwise under influence of the spring 353, until the stud 344 again engages the forward extension of the hammer operating arm 345. After the hook 360 has been disengaged, operation of the hammer cam 357, according to the time given in space G of the time chart (Fig. 26) causes the nodes 355 and 356, in cooperation with the surface 354, to rock the lever 349, the bail 348, and the arm 345 counterclockwise against the tension of the hammer operating spring 346. The spring 353 maintains the stud 344 in contact with the forward extension of the arm 345 during this counterclockwise movement to cock the hammer 339. As the nodes 355 and 356 ride off the surface 354, the lever 349, the bail 348, and the arm 345 are released to the action of the spring 346, which immediately returns said parts clockwise until the lower surface on the lever 349 strikes the eccentric bushing 351. Obviously, through the forward extensions of the arm 345 and the stud 344, the hammer 339 is returned counter-clockwise in unison with said arm, but, when said arm is stopped by the contact of the lever 349 with the bushing 351, said hammer, due to momentum, continues its clockwise impression movement to carry the ticket 334 and a superimposed inking ribbon (not shown) into contact with the printing wheels 106, 155, and 191 (Fig. 23) to record the data thereon upon said ticket. After the hammer 339 has completed its second impression stroke, the pitman 363 is returned forwardly or toward the left (compare spaces F and G, Fig. 26) to return the hook 360 counter-clockwise into engagement with the stud 359 to again rock the hammer 339 a slight distance clockwise to raise the stud 344 away from the hammer operating arm 345 as above mentioned, to prevent interference with the hammer controlling mechanism.

An arm, similar in every respect to the arm 345 and operated by the bail 348, is provided for the consecutive number and date hammer 341 (Fig. 25) to cause said hammer to function in exactly the same manner as explained above for the item hammer 339. Likewise a hook 371, similar in every respect to the hook 360 and operated in exactly the same manner by the yoke 361, cooperates with a stud 372 in a rearward extension of the hammer 341 to rock said hammer a slight distance clockwise to prevent interference with the controlling mechanisms therefor, as will be explained later.

*Impression controlling mechanism*

Mechanism is provided for controlling the impression strokes of the item hammer 339 (Figs. 23 and 25) and the consecutive number and date hammer 341, so that the proper recordings will be made upon the record material.

As explained earlier herein, the machine in its present embodiment is arranged for use in railroad ticket offices for printing the amount of the fare, the amount of the tax, and an item total of these two items upon a separable stub portion and also upon a main portion of the ticket 334 (Fig. 2). It is therefore evident that a complete ticket transaction consists of two item-entering operations to enter and record the amount of the fare and the tax and an item total operation to enter and record a total of the above two items. In the two item-entering operations, the item hammer 339 (Fig. 23) makes two impression strokes under influence of the hammer cam 357 each item operation to record the items upon the two portions of the ticket 334. However, in item-entering operations, printing movement of the hammer 341 is obstructed by a stud 373 (Fig. 25) in a hammer control plate 374 rotatably supported on the shaft 105, in cooperation with a flange 375 on a plate 376 secured to the hammer 341. The stud 373, in cooperation with the flange 375, retains a stud 377 in the hammer 341, similar in every respect to the stud 344, out of engagement with the forward extension of the operating arm similar to the arm 345 for said hammer 341, and, as a result, said hammer 341 does not make an impression stroke during item-entering operations.

In item total operations, movement of the total control lever 61 (Fig. 17) to item total position rocks the plate 374 (Figs. 23 and 25) a slight distance counterclockwise to move the stud 373 beneath a flange 378 on a plate 379 secured to the item hammer 339.

The plate 374 lies between the plates 376 and 379 (Figs. 23 and 25), and the stud 373 extends on both sides of said plate 374, one extension cooperating with the flange 375 for the hammer 341 and the other extension cooperating with the flange 378 for the hammer 339, said flanges being bent inwardly toward each other.

This counter-clockwise movement of the plate 374 is not sufficient to move the stud 373 out of the path of the flange 375; consequently, both the item hammer 339 and the date hammer 341 are disabled during the first cycle of an item total operation to prevent the recording of erroneous data during the first or selecting cycle of an item total operation. At the end of the first cycle of an item total operation, the plate 374 is rocked an additional distance counter-clockwise to move the stud 373 beyond the flange 378 for the hammer 339 and also beyond the flange 375 for the hammer 341 (Figs. 23 and 25). This frees the hammers 339 and 341 for two printing strokes in the last cycle of item total operations, so that the item total or the total of the fare and the tax will be recorded upon the stub portion and the main portion of the ticket 334.

The mechanism for rocking the plate 374, as explained above, to control the printing strokes of the hammers 339 and 341 in item total operations will now be explained in detail.

The control plate 374 (Fig. 23) has therein a slot which engages a stud 382 in a lever 383 free on a shaft 384 journaled in the frames 41 and 43.

The lever 383 carries a stud 385 yieldingly retained between opposing faces on arms 386 and 387 (Figs. 12, 13, and 23) free on the shaft 384 and urged in opposite directions by a spring 388 tensioned therebetween. The opposed inside surfaces of the arms 386 and 387 likewise engage a stud 389 in an operating crank 390 secured on the shaft 384. The arms 386 and 387 form a yieldable operating connection between the stud 389 and the stud 385 and normally carry the lever 383 in unison with the shaft 384 and the crank 390. However, under certain conditions, said arms permit the lever 383 and the crank 390 to move relatively to each other. Also secured on the shaft 384 (Fig. 21) is an arm 391 having a camming surface 392, which cooperates with a roller 393 on a pitman 394, the upper end of which rests on a bushing on said shaft 384, while the lower end of said pitman is pivotally connected to an arm 395 secured on the zero throwout shaft 230. A spring 396, one end of which is connected to an arm 400 fast on the shaft 384, urges said shaft and connected parts counter-clockwise to normally maintain the surface 392 in contact with the roller 393.

As explained previously, movement of the total control lever 61 from adding position to No. 1 Reset or item total position, or to any other reading or resetting position, for that matter, through the usual and well-known mechanism, rocks the zero throwout shaft 230 a slight distance clockwise (Fig. 21), which movement, through the arm 395, shifts the pitman 394 upwardly, causing the roller 393, in cooperation with the surface 392, to rock the arm 391, the shaft 384, and the crank 390 (Figs. 12, 13 and 23) also clockwise a slight distance. Clockwise movement of the crank 390 causes the stud 389 therein, in cooperation with the arms 386 and 387, to carry said arms clockwise in unison therewith. The arms 386 and 387, in cooperation with the stud 385, yieldingly carry the lever 383 clockwise in unison therewith, causing the stud 382, in cooperation with the notch in the plate 374 (Figs. 23 and 25), to rock said plate a slight distance counter-clockwise to move the stud 373 beneath the flange 378. The flange 378 (Fig. 23) is retained upwardly out of the radial path of the stud 373 by the hook 360 in the manner explained previously, so as not to interfere with movement of said stud 373 therebeneath.

The initial or manual counter-clockwise movement of the plate 374 (Fig. 25) and the stud 373 is not sufficient to move said stud from beneath the flange 375 for the date hammer 341, and therefore disengagement of the hooks 360 and 371 permits the flanges 378 and 375 to come to rest on the stud 373 before the studs 344 and 377 come into contact with the forward extensions of the corresponding operating arms 345. As a result, said arms 345 operate idly without imparting any movement to the item hammer 339 and the date hammer 341 during the first cycle of item total operation, and this is also true in all other types of reading or resetting operations.

Near the end of the first cycle of an item total operation, the zero throwout shaft 230 receives additional clockwise movement, according to the time given in space I of the chart (Fig. 26), which, through the arm 395 and the pitman 394 (Fig. 21), rocks the arm 391 and the shaft 384 also an additional distance clockwise, which additional clockwise movement would, under normal conditions, be transmitted by the arms 386 and 387 (Figs. 12, 13, and 23) to the hammer control lever 383. However, it is desirable to delay this action, as it will be seen, from a comparison of spaces G and I of the time chart (Fig. 26), that the mechanical movement is imparted to the zero throwout shaft 230 prior to the second impression stroke of the hammers 339 and 341.

The three positions of the stud 382 are shown in dot-and-dash lines in Fig. 22, the extreme upward position being the adding or normal position of said stud, the second or next lower position being the position to which said stud is moved by manual movement of the total control lever 61 from adding position to item total position, and the third or lowest position of said stud being the position to which it is moved when additional clockwise movement is imparted mechanically to the zero throwout shaft 230 near the end of the first cycle of said item total operation, as explained above. By comparing spaces F and I of the time chart (Fig. 26), it will be seen that, prior to the second clockwise movement of the zero throwout shaft 230, the cams 368 and 370 (Figs. 22 and 23) shift the pitman 363 rearwardly to move a surface 397 on a beak 398, on an upward extension of said pitman, beneath the stud 382, which is now in its second position, to obstruct movement of said stud to its third position when additional clockwise movement is imparted to the zero throwout shaft 230. As a result, the additional clockwise movement of the shaft 384 and the crank 390 (Figs. 12, 13, and 23) is not transmitted through the arms 386 and 387 to the stud 385 and the hammer control lever 383, as the yielding action of said arms, under influence of the spring 388, permits the arm 387 to move clockwise under influence of the stud 389, while the stud 385 holds the arm 386 stationary because further clockwise movement of the lever 383 is blocked by the stud 382 and the surface 397 of the pitman 363 (Fig. 22).

Near the end of the first cycle of an item total operation, the cams 368 and 370 restore the pitman 363 forwardly or toward the left, as viewed in Figs. 22 and 23, according to the time given in space F (Fig. 26), to withdraw the surface 397 from beneath the stud 382 to release the lever 383 and the stud 385 (Figs. 12, 13 and 23) to the action of the arm 386 and the spring 388, which immediately rock said parts clockwise until said stud 385 contacts the arm 387.

This immediately rocks the lever 383 and the stud 382 from their second position to their third position, causing said stud 383, in cooperation with the slot in the plate 374 (Figs. 23 and 25) to rock said plate 374 an additional distance counter-clockwise. This additional counter-clockwise movement of the plate 374 and the stud 373 moves said stud beyond the flange 378 for the hammer 339 and also beyond the flange 375 for the hammer 341 to free both hammers for printing movement during the second cycle of item total operations.

From a comparison of spaces G and I of the time chart (Fig. 26), it will be observed that during the second cycle of the item total operation the zero throwout shaft 230 and the pitman 394 (Fig. 21) are restored mechanically in a counter-clockwise direction to their second positions prior to the second printing stroke of the hammers 339 and 341. It is therefore necessary to delay return movement counter-clockwise of the lever 383 under influence of the shaft 384 and the crank 390 until the impression hammers have completed their second impression stroke in the second cycle of an item total operation.

Initial movement toward the right (Figs. 22 and 23) of the pitman 363, under influence of the cams 368 and 370, causes a downward surface 399 on the beak 398 of said pitman to move over the stud 382 to obstruct return counter-clockwise movement of said stud and the lever 383 under influence of the zero throwout shaft 230. It is therefore evident that the plate 374 (Figs. 23 and 25) is retained in its extreme counter-clockwise position to hold the stud 373 out of the path of the flanges 378 and 375, so as not to interfere with the second impression movements of the hammers 339 and 341.

From an observation of Figs. 12 and 13, it will be seen that a finger 401 of the crank 390 overlies the stud 385; consequently, return counter-clockwise movement of said crank and the shaft 384, by the spring 396, under influence of the zero throwout shaft 230, is obstructed as long as the surface 399 remains over the stud 382 (Fig. 22). Return forward or leftward movement of the pitman 363, near the end of the second cycle of item total operations (Fig. 22 and space F, Fig. 26), withdraws the surface 399 from above the stud 382 to release the lever 383, the crank 390, and the shaft 384 to the action of the spring 396, which immediately returns said parts counter-clockwise to their second positions, to which, it will be recalled, they were moved by manual movement of the total control lever 61 (Fig. 17) from adding position to item total position.

At the end of an item total operation, the total control lever 61 is automatically restored from item total position to adding position, in the usual and well-known manner as shown and described in United States patent to Samuel Brand, No. 1,736,067, issued November 19, 1929, and, in being so restored, restores the zero throwout shaft 230 counter-clockwise to normal position, said shaft in turn, through the mechanism shown in Fig. 21, permitting the spring 396 to restore the shaft 384 and the hammer control lever 383 (Figs. 23 and 25) counter-clockwise to normal position. The lever 383 in turn, through the stud 382, restores the control plate 374 clockwise to normal position, as shown here.

The arm 365 (Fig. 22), which carries the roller 367, functions to prevent injury to the parts in case the beak 398 of the pitman 363 stumbles on the stud 382 during initial movement toward the right of said pitman 363.

It will be recalled that the Ticket Number key 55 (Figs. 1 and 10) is used in conjunction with the amount keys 47 for printing a ticket number upon the audit strip 333 (Fig. 23), and mechanism controlled by the depression of said Ticket Number key is provided for rendering the item hammer 339 and the date hammer 341 inoperative in Ticket Number printing operations.

By reference to Fig. 10, it will be recalled that positioning of the transaction differential mechanism under control of the depressed keys 48 to 55 inclusive is transmitted by the beam 141 and the link 144 to the arm 146 free on the shaft 103. The arm 146 is connected by the tube 154 to a segment 402, which meshes with a gear 403 secured on a shaft 404 journaled in the frames 41 and 43, to form connections for transmitting the positioning of the transaction differential mechanism to said shaft 404. Also secured on the shaft 404 is a cam 405 (Figs. 23 and 25), the periphery of which cooperates with a roller 406 carried by a lever 407 free on a stud 408 in the frame 43. The lever 407 is pivotally connected by a link 409 to an arm 410 free on a stud 411 in the printer frame 43. The arm 410 carries a stud 412, which cooperates with surfaces 413 and 414 on downward extensions of the plates 376 and 379 secured to the hammers 341 and 339, respectively.

The contour of the cam 405 is outlined graphically in space E of the time chart (Fig. 26), from which it will be seen that, when the Ticket Number key 55 is depressed, the transaction differential mechanism positions said cam so that a high portion of its periphery, in cooperation with the roller 406, rocks the lever 407 clockwise against the action of a spring 415, causing said lever in turn, through the link 409, to rock the arm 410 counter-clockwise. Counter-clockwise movement of the arm 410 rocks the stud 412 into engagement with the surfaces 413 and 414 to obstruct printing movement of the hammers 341 and 339 so that the ticket number will not be recorded upon the insertable ticket 334. In this case, the audit strip hammer 336 (Fig. 23) functions to record the ticket number upon the audit strip 333.

Positioning of the cam 405 in zero position and also under influence of the keys 48 to 54 inclusive causes a low portion of the periphery thereof to be opposite the roller 406 to retain the lever 407 and the arm 410 in the positions shown here, so as not to interfere with the operation of the hammers 341 and 339.

Slip sensing mechanism

The machine embodying the instant invention is provided with the usual slip sensing or feeling mechanism for sensing the presence of a ticket 334 (Figs. 23 and 25) upon the table 337. The absence of a ticket causes the sensing mechanism to lock the hammers 339 and 341 against printing movement.

A sensing finger 416 pivoted on a stud 418 has an ear 420 held by a spring 419, against a lever 421 pivoted on a stud 422.

Upon operation of the machine the high portion of a cam 425 is withdrawn from a roller 424 on the lever 421 and a spring 423 moves the finger 416 upwardly to feel for a ticket or slip.

If there is no ticket on the table 337 a stud 426 of the lever 421 rocks a yoke 428 clockwise to move two arms 430 (only one shown here) beneath the flattened extensions of the studs 344 and 377 to obstruct printing movement of the hammers 339 and 341, the hooks 360 and 371 (Figs. 23 and 25) at this holds the studs 344 and 377 high enough to permit such movement of the arms 430 and when said hooks are rocked clockwise, as previously described, the studs 344 and 377 come to rest on the arms 430.

When the finger 416, in its sensing movement, contacts a ticket 334, clockwise movement of the lever 421 (Fig. 25), under influence of the spring 423, is interrupted, and, as a result, the upward extensions 430 of the yoke 428 remain in ineffective positions, as shown here, and therefore do not interfere with printing movement of the hammers 339 and 341.

*Control of printing mechanism by item keys*

When the keys 51 to 54 inclusive (Figs. 1 and 10) are used in so-called single-item operations, it is desirable that the printing hammers 339 and 341 make only one printing stroke. Therefore mechanism is provided which, under control of the transaction differential mechanism, disables the second impression stroke of said hammers in operations in which any one of the keys 51 to 54 inclusive is depressed.

Secured on the shaft 404 (Fig. 25) and positioned under influence of the transaction differential mechanism (Fig. 10) is a cam 433, the periphery of which cooperates with a roller 434 in a cam lever 435 free on the stud 408. A link 436 pivotally connects the lever 435 to a cam arm 437 free on a stud 438 in the frame 43. The arm 437 is pivotally connected by a link 439 to a bell crank 440 free on a stud 441 in the frame 41. A spring 442 urges the bell crank 440 counter-clockwise, which, through the link 439, urges the arm 437 clockwise, said arm in turn, through the link 436, urging the lever 435 clockwise to normally maintain the roller 434 in yieldable engagement with the periphery of the cam 433.

The link 439 (Fig. 25) has a slot 443 engaged by a stud 444 in the upper end of a lever 445 free on the shaft 105. A spring 446, tensioned between the stud 444 and the link 439, urges said stud and the lever 445 counter-clockwise to normally maintain said stud in contact with the left-hand end of the slot 443 and thereby form a yieldable connection between said link 439 and said lever 445. A link 447 freely connects a downward extension of the lever 445 to the upper end of an arm 448 secured on a sleeve 449 free on a stud 450 secured in the frame 43. Also secured on the sleeve 449 (Figs. 11 and 25) is an arm 451 having in its upper end a stud 452, which engages a horizontal slot in one end of a link 453, the other end of which is pivotally connected to the left-hand extension 430 of the yoke 428, which, it will be recalled by reference to Fig. 25, cooperates with the stud 377, while a similar extension cooperates with the stud 344 (Fig. 23) to control the printing movement of the hammers 341 and 339 through the slip sensing mechanism. The spring 429, which is tensioned between the left-hand extension 430 of the yoke 428 and the stud 452, forms a yieldable connection between the arm 451 and said yoke 428 to permit clockwise movement of said yoke (Figs. 11 and 25) under influence of the slip sensing mechanism, as explained above, independently of the controlling mechanism now being described.

As explained previously, the cam 433, like the cam 405 (Fig. 25), is positioned by the transaction differential mechanism under influence of the keys 48 to 55 inclusive (Figs. 1 and 10). In space D of the time chart (Fig. 26) is given a graphic outline of the contour of the cam 433, from which it will be seen that, when any one of the keys 51 to 55 inclusive is depressed, a high portion of the periphery of said cam is positioned opposite the roller 434 to rock the lever 435 counter-clockwise (Fig. 25), which, through the link 436 and the arm 437, shifts the link 439 forwardly or toward the left, as viewed here, against the action of the spring 442. Forward movement of the link 439, through the spring 446, carries the lever 445 counter-clockwise in unison therewith, which, through the link 447, rocks the arm 448, the sleeve 449, and the arm 451 (Fig. 11) clockwise. Clockwise movement of the arm 451, through the stud 452 and the link 453, rocks the yoke 428 also clockwise to move the two upward extensions 430 thereof beneath their corresponding studs 377 and 344 (Figs. 23 and 25) in the hammers 341 and 339 to obstruct the printing movement of said hammers.

Just prior to the time that the first impression node 355 (Fig. 23) on the hammer cam 357 engages the surface 354, the high portion of a cam 454 (Fig. 11), secured on the shaft 358, engages a roller 455 mounted on a crank 456 secured to the sleeve 449, to rock said crank, said sleeve, and the arms 451 and 448 (Fig. 25) counter-clockwise. Counter-clockwise movement of the arm 448, through the link 447, rocks the lever 445 clockwise against the action of the spring 446, during which movement the stud 444 moves idly in the slot 443. Counter-clockwise movement of the arm 451, through the spring 429 and the link 453, rocks the yoke 428 also counter-clockwise to move the extensions 430 of said yoke from beneath the studs 377 and 344 to free the hammers 341 and 339 for the first impression stroke under influence of the node 355 (Fig. 23) in cooperation with the surface 354.

After the first impression stroke of the hammers 341 and 339 (Figs. 23 and 24) and before the second impression node 356 engages the surface 354, the cam 454 (Fig. 11), through the connections described above, releases the yoke 428 to the action of the spring 446, which immediately rocks said yoke clockwise, to move the extensions 430 thereof beneath the studs 377 and 344 to obstruct the second impression stroke of said hammers.

When any one of the keys 48, 49, or 50 is depressed, or when the transaction differential mechanism is positioned at zero, the cam 433 is positioned so that a low portion of its periphery is opposite the roller 434 (Fig. 25 and space D, Fig. 26). Therefore, the lever 435 and connected parts remain in the positions shown in Fig. 25, and under this condition the hammers 341 and 339 are free to make two impression strokes.

*Ticket feeding mechanism*

It will be recalled that the machine of this invention is presently arranged for making duplicate recordings of two items and a total thereof upon a stub or agent's portion and upon a main or customer's portion of the railroad ticket 334 tion (Figs. 10 and 17) moves the zero stop pawl 236 for the transaction keys to effective position, in the manner explained earlier herein, to cause the transaction differential mechanism to be positioned at zero upon operation of the machine. Likewise, movement of the total control lever to item total position, through the mechanism shown in Figs. 15 and 17, and explained earlier herein, sets up a condition which causes the set of wheels on the No. 2 totalizer line corresponding to the Auditor's Total key 58 to be selected for engagement with the amount differentials in adding time, so that the amount of the item total will be transferred to said set of wheels.

It will be recalled that, in total and sub-total operations, the main cam shaft 46 (Fig. 9) and all the other shafts connected thereto make two revolutions instead of the one revolution required for adding operations. In view of this, the first revolution of the main cam shaft 46 is often referred to as the first cycle of a total or sub-total operation, and the second rotation of said shaft is often referred to as the second cycle of such operation.

The first cycle of all total recording operations is utilized to select the desired set of totalizer wheels for engagement with the differential actuators, and, in view of this, it is desirable to render the printing hammers 339 and 341 (Figs. 23 and 25) inoperative during said first cycle. This, it will be recalled, is effected by initial movement of the zero throwout shaft 230 (Figs. 17 and 21), which is imparted thereto by manual movement of the total control lever from adding position to item total position. Initial movement of the shaft 230 rocks the shaft 384 and, through the spring-actuated arms 386 and 387 (Figs. 23), the lever 383 clockwise, causing the stud 382 to position the plate 374 so that the stud 373 is in the path of the flange 378 to block printing movement of the item hammer 339. The stud 373 remains in the path of the flange 375 to block printing movement of the date hammer 341 during the first cycle of item total operation.

Inasmuch as the cams 527 and 528 (Fig. 23), which impart up-and-down movement to the slide 487, make two revolutions in item total operations, it is desirable to obstruct movement of said slide 487 under influence thereof during the first cycle of item total operations to prevent idle shifting back and forth of the ticket 334. Clockwise movement of the lever 383 (Fig. 23), when the total control lever 61 is moved from adding position to item total position, causes the stud 382 therein, in cooperation with a camming slot 532 in a pawl 533 (Figs. 7 and 23) free on the stud 458 in the frame 43, to rock said pawl clockwise to move a downward extension 535 thereon into the path of a bent-over ear 536 on the upper end of the slide 487, as shown in Fig. 7. This, together with the bar 497, in cooperation with the step 495, holds the slide 487 stationary during the first cycle of item total operation.

Prior to operation of the printing hammers in the second cycle of item total operations, additional clockwise movement is imparted to the lever 383 (Figs. 23 and 25), in the manner explained earlier herein, to cause the stud 382 to rock the plate 374 an additional distance counter-clockwise to move the stud 373 beyond the flange 378 for the item hammer 339 and beyond the flange 375 for the date hammer 341, so that both of said hammers will receive two impression strokes during the last cycle of item total operations. Likewise, the additional clockwise movement of the lever 383 (Figs. 7 and 23) causes the stud 382, in cooperation with the cam slot 532, to return the pawl 533 counter-clockwise to move the downward extension out of the path of the ear 536, as shown in Fig. 8, so that the slide 487 will be free to move up and down during the last cycle of item total operations.

The positioning of the transaction differential mechanism at zero during the first and second cycles of item total operations positions the cams 505 and 509 (Figs. 23 and 24 and spaces B and C, Fig. 26) so that the highest portion of the periphery of said cam 505 is opposite the corresponding roller 504 and so that the lowest portion of the periphery of the cam 509 is opposite the corresponding roller 508. This positions the bar 497 in its extreme inward position, as shown in Figs. 7 and 8, so that said bar remains in the path of the step 496 on the slide 487. Likewise, the highest portion of the periphery of the cam 505 positions the lower bar 492 in its extreme outward position, as shown in Figs. 7 and 8, out of the path of the steps 490 and 491 on the slide 487.

Prior to initial upward movement of the slide 487, and while said slide is retained in the position shown in Fig. 7, the hammers 339 and 341 receive their first impression stroke to print the amount of the item total ($37.40) upon the stub portion of the ticket 334 (Fig. 2) directly beneath the tax item. Movement of the total control lever to item total position causes a symbol (in this case a star) to be recorded immediately to the left of the item total to identify this type of transaction, and the positioning of the operator's type wheel 191 (Fig. 23), under influence of the automatic total transfer mechanism, causes the symbol (TL) to be recorded immediately to the right of the amount of the item total. Functioning of the date hammer 341 causes the date (January 18) and the consecutive number of this ticket transaction (982) to be recorded to the left of the amount of the item total.

After the first recording of the item total on the stub portion of the ticket 334 has been completed, upward movement is imparted to the slide 487, and, inasmuch as the bar 492 (Figs. 8 and 23) is retained out of the path of the steps 490 and 491, said slide 487 is free to move all the way upwardly until the bottoms of the alined slots therein contact their corresponding studs 488 and 489, as shown in Fig. 8. This full upward movement of the slide 487, through the rack teeth 486 in cooperation with the gearing shown in Fig. 23 connecting said rack teeth to the feed roller 459, rotates said roller clockwise to feed the ticket 334 inwardly to properly position the main portion of said ticket in relation to the printing mechanism to receive the second recording of the item total and the data connected therewith. After the slide 487 has completed its upward movement, the second impression stroke is imparted to the item hammer 339 and the date hammer 341, to cause a second recording of the item total and the other data associated therewith to be made upon the main portion of the ticket 334 directly beneath the tax item, as shown in Fig. 2.

After the second recording of the item total has been made upon the main portion of the ticket 334, the feed roller framework 461 (Figs. 22 and 23) is restored clockwise, in the manner explained earlier herein, which movement of said framework, through the link 511, in cooperation with the stud 512, returns the bar 497 outwardly or toward the left, to the position shown in Figs. 3 and 23, out of the path of the steps 495 and 496. This permits the cams 527 and 528 (Fig. 23) and connected mechanism to return the slide 487 full distance downwardly to starting position, which is determined by the upper ends of the alined slots therein contacting the studs 488 and 489 (compare spaces A and F, Fig. 26).

By reference to Fig. 22, it will be recalled that the stud 382 in the lever 383, which is moved to its various positions under influence of the zero throwout shaft 230 (Fig. 21), is further controlled by the surfaces 397 and 399 on the beak 398 of the pitman 363. Consequently, near the end of the second cycle of item total operation and after the slide 487 has been restored to its downward position, the surface 399 is moved from above the stud 382 to permit said stud and the lever 383 to be spring-restored counter-clockwise to normal position, as shown in Fig. 23. During this restoring movement of the lever 383, the pawl 533 is free to move idly back and forth, inasmuch as, at this time, the ear 536 is beneath the downward extension 535 of said pawl, as shown here.

Pullman fare and tax transactions

In addition to the ticket printing transaction outlined above, the machine embodying the present invention is also arranged for use in connection with transactions involving Pullman fare and tax in addition to the regular fare and tax items.

In such transactions, the regular fare and the tax thereon are recorded upon the stub and the main portions of the ticket 334 in exactly the same manner as described above. However, instead of an item total operation being performed to record the total amount of the fare and the tax, the total control lever 61 is moved upwardly to No. 1 Read or item sub-total position; instead of the item totalizer being cleared, it is read; and a sub-total of the fare and the tax, together with the date and the consecutive number, is recorded upon the stub portion and the main portion of the ticket 334, in exactly the same manner as in the item total operation explained earlier herein.

Next, the completed ticket 334 is removed from the machine, and the envelope in which the Pullman tickets are to be placed later is placed on the table 337 and moved into printing position by use of the line 342 on said table in cooperation with a corresponding line upon said Pullman ticket envelope.

In item sub-total operations, the depressed operator's key 56 (Fig. 1) is not released, as in item total operations; neither is the auditor's totalizer on the No. 2 totalizer line automatically selected for addition, as in item total operations. By reference to Fig. 10, it will be recalled that, in item sub-total operations, the arm 254, in cooperation with the roller 252, retains the arm 251 in its counter-clockwise position, in which position the extension 250 is latched over the stud 249 to secure the control plate 247 in its downward position to lock the keys 51 and 52 against depression. It is, therefore, evident that these keys will remain locked against depression when the total control lever is returned from item sub-total position to adding position for the recording of the Pullman fare and Pullman tax items. This securing of the control plate 247 in its downward position, however, does not interfere with depression of the Pullman Fare or Pullman Tax keys 53 and 54, as there are no cooperating surfaces 246 on said plate 247 for these keys.

With the total control lever 61 again in adding position, the operator sets up the amount of the Pullman fare on the amount keys 47 and initiates machine operation by depressing the Pullman Fare key 53. During machine operation, positioning of the transaction differential mechanism, under control of the Pullman Fare key 53 (Fig. 25 and space D, Fig. 26) causes a high portion of the periphery of the cam 433 to be moved opposite the roller 434 to rock the lever 435 and, through the link 436, the cam arm 437 counter-clockwise. Counter-clockwise movement of the arm 437, through the cam surface 474 thereon, in cooperation with the stud 475, permits the spring 478 to rock the lever 476 counter-clockwise to move the ear 479 beneath the stud 489, to retain the printer feed roller framework 461 in ineffective position, so that no feeding movement will be imparted to the Pullman ticket envelope.

Counter-clockwise movement of the arm 437 (Fig. 25), through the link 439 and the spring 446, rocks the lever 445 counter-clockwise in unison therewith to block the second impression stroke of the hammer 339 in the manner explained previously. However, it will be recalled that the mechanism shown in Fig. 11, including the cam 454, restores the blocking means operated by the lever 445 to ineffective position, so as not to interfere with the first impression movement of said hammer. Therefore, in the Pullman fare operation, first impression stroke of the hammer 339 records the amount of the Pullman fare and other data associated therewith upon the Pullman ticket envelope.

After the Pullman fare operation has been completed, the operator hand-feeds or spaces the Pullman ticket envelope, sets up the amount of the Pullman tax upon the amount keys 47 (Fig. 1), then depresses the Pullman Tax key 54 to initiate operation of the machine. During the Pullman tax operation, the amount of the tax, together with other data connected therewith, is recorded upon the Pullman ticket envelope in exactly the same manner as the Pullman fare.

After the Pullman tax operation has been completed, the operator again hand-spaces the Pullman ticket envelope, after which the total control lever 61 is moved downwardly to No. 1 Reset or item total position, and an item total operation is initiated by depression of the regular starting bar 60. In the second cycle of the item total operation, the ticket feeding mechanism shown in Fig. 23 functions, as also do the hammers 339 and 341, in exactly the same manner as explained earlier herein in connection with item total operations. Therefore the item total of the regular fare, the Pullman fare, the regular fare tax, and the Pullman fare tax is recorded in two different places upon the Pullman ticket envelope.

As in regular item total operations, the auditor's totalizer on the No. 2 totalizer line is automatically selected for adding, and the item total is automatically transferred thereto as it is cleared from the item totalizer. The feeding of the envelope for the Pullman tickets in the item total operation, as explained above, and the printing of said item total in two places upon said envelope, are purely incidental and have no particular bearing upon this type of item total operation.

by a slot in the upper end of a lever 507 (Figs. 23 and 24) free on the stud 502. Mounted on a downward extension of the lever 507 is a roller 508, which cooperates with the periphery of a plate cam 509 secured on the shaft 404. A spring 510 is tensioned to urge the lever 507 clockwise and the bar 497 toward the right, but is normally restrained from doing so by a link 511 (Fig. 23) pivotally connected at its upper end to the stud 463 in the frame 461, the other end of said link 511 having a slot which engages a stud 512 in an upward extension of the bar 497.

The shaft 404 and the cam 509 (Figs. 23 and 24) are always positioned at zero in the item total or last of the sequence of three operations required to complete a ticket transaction, and, when said cam is so positioned, the lowest portion of its periphery (space C, Fig. 26) is opposite the roller 508. This would normally position the lever 507 all the way inwardly in the path of the steps 495 and 496. However, the frame 461, through the link 511, insures that the bar 497 is restored outwardly, at the end of an item total operation, so that said bar is out of the path of the steps 495 and 496, thereby permitting the slide 487 to be restored downwardly full distance, as shown in Fig. 23, to normal or starting position.

The ticket feed slide 487 (Fig. 23) has, near its lower end, a horizontal slot engaged by a stud 513 in a rearward extension of a lever 514 free on a stud 515 in the frame 43. An angular extension of the lever 514 carries a stud 516 yieldingly embraced by companion spring-actuated arms 517 and 518 free on the stud 515 and urged in opposite directions, or toward each other, by a spring 519 tensioned between them. Also extending between the arms 517 and 518 is an operating stud 520 in an arm 521 free on the stud 515 and pivotally connected by a link 522 to a lever 523 free on a stud 524 in the frame 43. The lever 523 carries rollers 525 and 526, which cooperate, respectively, with the peripheries of companion plate cams 527 and 528 journaled on a stud 529 carried by the left frame 41. These cams 527 and 528 are driven one clockwise revolution, as viewed in Fig. 23, in adding operations, and two such revolutions in reading and resetting operations by suitable gearing such as is illustrated and described in United States Patent No. 1,812,194, issued to Samuel Brand on June 30, 1931.

During rotation of the shaft 529, the cams 527 and 528 rock the lever 523 and, through the link 522, the arm 521 first counter-clockwise and back to normal position, according to the time given in space A (Fig. 26). Oscillating movement of the arm 521 is transmitted through the stud 520 to the companion arms 517 and 518 and thence by said arms through the stud 516 to the lever 514 and the ticket feed slide 487, to yieldingly shift said slide upwardly and then downwardly to rotate the feed roller 459 back and forth to cause the ticket 334 to be properly fed back and forth in a manner now to be explained.

*Machine operation in ticket printing transactions*

As explained previously, a complete ticket printing transaction requires three operations of the machine; namely, two item-entering operations, to enter the amount of the fare and tax thereon in the proper totalizers and to record these items upon the stub portion and the main portion of the ticket 334, and an item total operation, in which the item totalizer is cleared and the amount therein is recorded upon the stub and upon the main portion of said ticket 334. It will likewise be recalled that, in the item total operation, the differential mechanism for the transaction or item keys is positioned at zero by the zero stop pawl 236 (Fig. 10) to position the shaft 404 and the cams 505 and 509 as shown in Figs. 23 and 24. Likewise, in item total operations, the slide 487 is returned downwardly to its extreme downward position, which is determined by the studs 488 and 489 in cooperation with the top portions of their corresponding slots in said slide 487. Likewise, the cam 505 restores the bar 492 forwardly, as shown here, and the ticket tension frame 461, through the link 511, restores the bar 497 forwardly, as shown here, out of the path of the steps 495 and 496 on the slide 487, so as not to interfere with full return downward movement of said slide.

With the parts in starting position, as shown in Fig. 23, the operator places an unprepared ticket 334 on the surface of the table 337 (Figs. 2 and 23), alines the locating line on said ticket with the starting line 342, depresses the proper operator's key 56 (Fig. 1), which in this case is the No. 4 operator's key, sets up the amount of the fare ($34.00) upon the amount keys 47, and initiates machine operation by depressing the Card key 48, inasmuch as this is the card type of ticket. In the preparation of the longer or coupon type of ticket, the Coupon key 49 would be used instead of the Card key 48. That is the only substantial difference between these two keys.

During this first item-entering operation, the depressed amount keys, through their corresponding differential mechanisms, position the corresponding type wheels 106 in accordance with the values thereof; the depressed operator's key 56, through the operator's differential mechanism (Fig. 15), positions the corresponding type wheel 191 (Fig. 23) in accordance therewith; and the depressed item key 48, through the transaction differential mechanism (Fig. 10), positions the corresponding transaction type wheel 155 in accordance therewith. It will be recalled that, in item-entering or adding operations, the control plate 374 (Fig. 25) is so positioned that the stud 373 is in the path of the flange 375 to obstruct printing movement of the consecutive number and date hammer 341, and consequently this hammer does not function in item-entering operations but does function in reading and resetting operations. The tension mechanism shown in Figs. 22 and 23 functions prior to the first impression stroke of the hammer 339 to rock the frame 461 counter-clockwise to cause the feed roller 459 to yieldingly impinge the ticket 334 against the pressure roller 457 to secure said ticket against displacement (compare spaces F and G, Fig. 26). From a comparison of spaces A, B and G of the chart (Fig. 26), it will be seen that the first impression stroke is imparted to the item hammer 339 while the feed slide 487 (Fig. 23) is retained in its extreme downward position, as shown here.

This first impression stroke of the item hammer 339 (Fig. 23) causes the amount of the fare ($34.00) (Fig. 2), the symbol for the key 48 (CD), and the Roman numeral IV for the operator's key 56 to be recorded in the first or extreme top position on the stub portion of the ticket 334. It will be recalled that the total control lever 61 (Fig. 1) positions a corresponding printing wheel, not shown, but similar in every respect to the transaction type wheel 155 (Fig. 23), and, when said total control lever is in adding position, the corresponding type wheel is positioned to print an identification number (80) for the machine immediately to the left of the amount of the fare.

The depressed item key 48 (Figs. 1 and 10) positions the transaction differential mechanism in eighth position, which position is transmitted by the beam 141, the link 144, the shaft 103, the segment 402, and the gear 403 to the shaft 404 and the cams 505 and 509 (Fig. 23). The contours of the peripheries of the cams 505 and 509 are given, respectively, in spaces B and C of the time chart (Fig. 26), from which it will be seen that, when said cams are positioned under influence of the Card key 48, the lowest portion of the periphery of the cam 505 is positioned opposite the corresponding roller 504 to in turn position the corresponding bar 492 in its extreme inward position in the path of the step 490 on the slide 487. It will likewise be seen that an intermediate portion of the periphery of the cam 509 is positioned opposite the corresponding roller 508 (Figs. 23 and 24). However, as the slide 487 is still retained in its extreme downward position, as shown in Figs. 3 and 23, inward movement of the bar 497 under influence of said cam 509 is obstructed.

After the first impression has been made, and prior to the second impression stroke of the item hammer, the cams 527 and 528 (Fig. 23) shift the slide 487 upwardly, according to the time given in space A (Fig. 26) until such upward movement is terminated by the step 490 contacting the bar 492, as shown in Fig. 4. Upward movement of the slide, through the rack teeth 486, rotates the gears 485 and 484 counter-clockwise to cause said gear 484 to rotate the pinion 483, the shaft 460, and the feed roller 459 clockwise a predetermined extent to feed the ticket 334 inwardly into position for the second recording of the first item on the main portion thereof. After the ticket 334 has thus been fed inwardly, the item hammer 339 receives its second impression stroke to record the identical data, recorded in the first position on the stub portion of said ticket in the first position on the main portion of said ticket, 334.

Upward movement of the slide 487, in the first item-entering operation, withdraws the edge of the step 495 from the inward end of the bar 497 to release said bar and its corresponding lever 507 (Figs. 3, 23, and 24) to the action of the spring 510, which immediately rocks said parts inwardly and clockwise, respectively, until the roller 508 contacts the intermediate portion of the periphery of the cam 509. This positions the inward end of the bar 497 in the path of the step 495, as shown in Fig. 4, and, consequently, downward return movement of the slide 487 near the end of the first item-entering operation will cause said step 495 to contact the bar 497 to position said slide, as shown in Fig. 5. This downward movement of the slide 487 causes the rack teeth 486 thereon and the train of gearing associated therewith to rotate the feed roller 459 in a reverse or counter-clockwise direction to feed the ticket 334 outwardly into proper position to receive the first recording of the second or tax item upon the stub portion thereof.

It is to be noted that the arms 517 and 518 (Fig. 23), under influence of the spring 519, permit the variable up-and-down movement of the slide 487, under influence of the invariable back-and-forth movement of the arm 521, said spring 519 being of adequate strength to insure the proper feeding of the ticket 334.

In the second item-entering operation, the amount of the tax on the fare is set up on the amount keys 47, and, as the No. 4 operator's key 56 remains depressed, machine operation is initiated by depression of the Tax key 50. During the second item-entering operation, the first impression stroke of the item hammer 339 re-records the amount of the tax ($3.40) (Fig. 2), the tax symbol (TX), the operator's number (IV), and the register number (80) upon the stub portion of the ticket 334 directly beneath the recording of the fare.

The Tax key 50, through the transaction differential mechanism (Fig. 10) positions the cam 505 (Fig. 23 and space B, Fig. 26) so that an intermediate portion of its periphery is opposite the corresponding roller 504 to position the bar 492 in the path of the step 491, as shown in Fig. 5. Likewise, the cam 509 is so positioned that the lowest portion of its periphery is opposite the roller 508 (space C, Fig. 26). However, in this case, the shoulder between the steps 495 and 496 on the slide 487 obstructs inward movement of the bar 497, as shown in Fig. 5, until upward movement of said slide 487.

After the first impression of the tax item has been made upon the stub portion of the ticket 334, the slide 487 is moved upwardly by the cams 527 and 528 (Fig. 23 and space A, Fig. 26) until the step 491 contacts the bar 492, as shown in Fig. 6. Upward movement of the slide 487 withdraws the shoulder between the steps 495 and 496 from the bar 497 and permits the spring 510 (Fig. 24) to immediately shift said bar inwardly until the roller 508 contacts the low portion of the periphery of the cam 509 to position said bar in the path of the step 496 on said slide 487, as shown in Fig. 6.

Upward movement of the slide 487, through the rack teeth 486, in cooperation with the gearing associated therewith, rotates the feed roller 459 clockwise, the same as in the first item-entering operation, to forward-feed the ticket 334 a predetermined extent inwardly to properly position the main portion of said ticket to receive the second recording of the tax item thereon. Immediately after the slide 487 has completed its upward movement, the second impression stroke is imparted to the item hammer 339 to cause the amount of the tax ($3.40) and the other data associated therewith to be recorded upon the main portion of the ticket 334 directly beneath the recording of the fare thereon. After the second recording of the tax item has been made upon the main portion of the ticket 334, the slide 487 is returned downwardly until the step 496 contacts the bar 497, as shown in Fig. 7, to position said slide and the ticket 334 in proper position to receive the first recording of the item total upon the stub portion of said ticket.

The third or final operation in the sequence of ticket printing operations is an item total operation, in which the item totalizer is reset and the total of the fare and the tax items contained therein is simultaneously recorded upon the stub portion and upon the main portion of the ticket 334. The machine is conditioned for the item total operation by moving the total control lever 61 (Figs. 1 and 17) from adding position to No. 1 Reset or item total position.

Movement of the total control lever 61 from adding position to No. 1 Reset or item total posi- The Miscellaneous key 51 (Figs. 1 and 10) is used for the registering and recording of various miscellaneous cash items, and the Conductor's and Steward's key 52 is used for registering and recording certain items, such as cash fares collected by the conductor, and cash received for meals by the steward. The keys 51 and 52 are used in much the same manner as the Pullman Fare key 53 and the Pullman Tax key 54, in that depression of these keys disables the ticket feeding mechanism and causes the impression hammers to make only one impression stroke during operations in which these keys are used to record the amounts in connection therewith upon slips placed upon the table 337 and hand-spaced in much the same manner as explained in connection with the envelope for the Pullman tickets.

Items entered under control of the keys 51 and 52 are accumulated in the item totalizer, the same as in regular item-entering operations, and it is necessary to perform an item total operation in order to clear said item totalizer and to transfer the amount therein to the auditor's totalizer.

Depression of either of the keys 51 or 52 shifts the control plate 247 (Fig. 10) upwardly, as explained before, to lock the keys 48, 49, 50, and 55 against depression. As in regular item-entering operations, functioning of the transaction differential mechanism frees the arm 251 for counter-clockwise movement to move the extension 250 beneath the stud 249. This secures the control plate 247 in upward position, to retain the keys locked against depression until said arm 251 is restored clockwise by the shaft 230 in a subsequent item total operation. It should therefore be clear that, in item entering operations controlled by the keys 51 and 52, the arm 251 enforces a subsequent item total operation, the same as in regular item-entering operations under control of the keys 48, 49, and 50.

During the item total operation in connection with the Miscellaneous key 51 and the Conductor's and Steward's key 52, the amount cleared from the item totalizer is added into the auditor's totalizer on the No. 2 totalizer line exactly the same as other item totals. It is therefore evident that a grand total of all cash items is accumulated in the auditor's totalizer.

*Transaction total operations*

It will be recalled that, in item-entering operations, the keys 48 to 54 inclusive (Figs. 1 and 10) select the associated set of wheels on the No. 3 or transaction totalizer line corresponding thereto for addition to accumulate totals of the various items in the corresponding totalizers. At certain intervals, it is desirable to reset the transaction totalizers and record the totals therein upon a suitable balance sheet having divisions thereon for each item total. The No. 3 totalizer line is selected and conditioned for engaging and disengaging movement in resetting time by movement of the total control lever 61 downwardly to No. 3 Reset position. Thereafter, the different totalizers may be selected for resetting and machine operation may be initiated by depression of the corresponding keys 48 to 54 inclusive. The divisions on the balance sheet for the various transaction totals may be alined with the printing mechanism by means of lines on said balance sheet which may be brought into register with the line 342 (Fig. 2) on the top surface of the slip table 337.

In transaction total resetting operations, the ticket feeding framework 461 (Figs. 22, 23, and 25) is rocked clockwise to cause the feed roller 459 to clamp the inserted balance sheet against the upper pressure roller 457 to prevent displacement of said balance sheet during machine operations. However, movement of the total control lever to No. 3 Reset position, through the link 303 (Fig. 15) and the crank 304, rocks the shaft 103 counter-clockwise, as viewed here, and clockwise as viewed in Fig. 23, to move surface 537 on an upward extension of an arm 538 secured thereon into the path of a corresponding shoulder 539 formed on the ticket feed slide 487, to obstruct upward movement of said slide under influence of the cams 527 and 528 and to latch said slide stationary so that no feeding movement will be imparted to the balance sheet. During the transaction total operations, the selected set of totalizer wheels on the No. 3 totalizer line is cleared and the amount therein is simultaneously recorded upon the balance sheet by operation of the impression hammers 339 and 341 (Figs. 23 and 25) in the second cycle of said total operations.

If desirable, the totalizers on the No. 3 totalizer line may be sub-totalized or read by movement of the total control lever 61 (Figs. 1 and 10) upwardly to No. 3 reading position and by using the keys 48 to 54 inclusive for selecting the various totalizers on said No. 3 line for engagement with the amount actuators. Movement of the total control lever to No. 3 reading position rocks the shaft 103 counter-clockwise, as viewed in Fig. 23, to move a surface 540 on a downward extension of the arm 538 into the path of a shoulder 541 formed on a hook-shaped downward extension of the slide 487, to obstruct upward movement of said slide, and to latch said slide in its extreme downward position so that the feed roller 459, in cooperation with the pressure roller 457, will function to clamp the balance sheet against displacement without imparting any feeding movement thereto, the same as in resetting operations in connection with the No. 3 totalizer line.

The operators who possess the keys to the locks 57 for the operators' keys 56 (Figs. 1 and 15) may likewise reset the corresponding sets of wheels on the No. 2 totalizer line by moving the total control lever 61 to No. 2 Reset position and by depressing the proper key 56 and using the regular starting bar 60 to initiate operation of the machine. In such resetting operations, the set of totalizer wheels on the No. 2 totalizer line corresponding to the depressed key 56 is reset and the amount therein is recorded upon an insertable slip which has previously been placed upon the top of the table 337 and alined with the printing mechanism by means of the line 342 (Fig. 2).

As in resetting operations in connection with the No. 3 totalizer line, movement of the total control lever to No. 2 Reset position rocks the shaft 103 clockwise, as viewed in Fig. 23, to move the surface 537 into the path of the shoulder 539 to secure the slide 487 against movement, so that the feed and pressure rollers will hold the inserted slip against displacement while the impression hammers are recording the amount of the operator's total thereon. Likewise, the operators' totalizers may be read by movement of the total control lever 61 (Figs. 1 and 15) upwardly to No. 2 Read position and by use of the keys 56 to select the corresponding sets of wheels on the No. 2 totalizer line for engagement with the amount actuators. Movement of the total control lever to No. 2 reading position rocks the shaft 103 and the arm 538 counter-clockwise, as viewed in Fig.

23, to move the surface 540 above the shoulder 541 to latch the slide 487 against movement, so that the feed and pressure rollers will secure the slip against displacement while the impression hammers function to record a reading of the selected operator's totalizer thereon.

It will be remembered that every amount cleared from the No. 1 or item totalizer is automatically transferred to the auditor's totalizer on the No. 2 totalizer line. Likewise, the auditor's total may be read at any time by movement of the total control lever 61 to No. 2 Read position, depression of the Auditor's Total key 58, and initiation of machine operation by depression of the regular starting bar 60.

It will also be recalled that the auditor's totalizer is normally locked against resetting through the lock 59 (Fig. 1), which cooperates with the locking lever 313 (Fig. 15), and, when said lock is effective, said lever is free to move into the path of the shoulder 323 on the arm 324 to obstruct counter-clockwise releasing movement of the key lock shaft 325, thus preventing operation of the machine. The lever 313 is rendered effective by movement of the total control lever to No. 2 Reset position, which, through the train of mechanism shown in Fig. 15 and explained earlier herein, positions the control plate 310 so that the notch 319 therein is opopsite the roller 312, thus permitting the spring 315 to move the extension 322 of said lever 313 into the path of the shoulder 323 to obstruct releasing counter-clockwise movement of the key lock shaft 325 when the shoulder on the control plate 317 is withdrawn from the stud 316 upon depression of the Auditor's Total key 58.

Operation of the lock 59 (Fig. 1) by the possessor of the key thereto locks the lever 313 in ineffective position, as shown in Fig. 15, so that it cannot move under influence of the cam plate 310 when the total control lever 61 is moved to No. 2 Reset position, thereby permitting resetting of the auditor's totalizer. Like every other transaction, the amount cleared from the auditor's totalizer is recorded upon the audit strip 333 and may, if desired, be recorded upon an insertable slip properly positioned on the table 337 (Fig. 23).

In the foregoing description, the system chosen to represent the use of the machine embodying the present invention is that of preparing railroad tickets by printing the fare and tax items and an item total thereof upon the stub and the main portions of said ticket. Obviously, this is but one of the many ways in which such a machine may be used to advantage, and it is, therefore, neither the intention nor the desire to limit said machine to any particular business system or to any particular use, as said machine may, with minor alterations and adjustments, be arranged for use in connection with many other business systems.

While the form of mechanism shown and described herein is admirably adapted to fulfill the objects primarly stated, it is to be understood that it is not intended to confine the invention to the one form or embodiment disclosed herein, for it is susceptible of embodiment in various forms all coming within the scope of the claims which follow.

What is claimed is:

1. In a machine of the class described, arranged to perform a series of related operations and having printing means which functions twice in each of said related operations to print two identical records of each of said operations on an insertable slip to obtain two identical series of records of each series of operations, the combination of means operable differentially in two directions to feed the slips back and forth progressively in line-spacing relation to the printing means and a synchronism with the operation of said printing means to cause the two identical records to be printed one above the other on different portions of said slip; and means to control the differentially operable feeding means to govern the extent of movement of the feeding means in each direction of its movement to cause the series of records of each series of related operations to be properly line-spaced on their respective portions of said insertable slip.

2. In a machine of the character described, arranged to perform a series of related operations to obtain two identical series of records of each of said series of operations, said machine having printing means which functions twice in each operation to print two identical records of each operation on an insertable slip, the combination of means to feed the slip; means operable under yielding pressure to drive the feeding means in two directions to feed the slip back and forth in relation to the printing means to present two different parts of said slip to said printing means; means to provide said yielding pressure; and means to control the extent of movement of the feeding means in each direction under influence of the yielding pressure operated driving means to cause each series of identical records for each series of related machine operations to be properly spaced one above the other on their respective parts of the slip.

3. In a machine of the character described, arranged to perform a series of related operations to obtain two identical series of records of each of said series of operations, said machine having printing means which functions twice in each operation to print two identical records relating to each of said operations on an insertable slip, the combination of means, including a shiftable slide, to feed the slip; means connected to said slide to shift the slide different extents in two directions to feed the slip back and forth in relation to the printing means and in synchronism with the operation of said printing means to present different parts of said slip to said printing means; and means cooperating with said slide to control the extent of movement thereof in each direction under influence of the shifting means to cause each series of identical records for each series of related machine operations to be properly spaced one above the other on their respective parts of said slip.

4. In a machine of the class described, arranged to provide a duplicate record of a series of related entries, said machine having printing elements and impression means coacting therewith to print an original record and a duplicate record of each entry on different portions of an insertable slip the combination of a pressure roller; a feed roller yieldably mounted to press the slip against the pressure roller for the purpose of feeding said slip means, including a shiftable slide, to revolve the feed roller to feed the slip; means yieldably connected to the slide to shift it in two directions to feed the slip back and forth in relation to the printing elements and in synchronism with the operation of the impression means to cause the identical records of each entry to be made on the different portions of said slip; and differentially adjustable means coacting with the slide to control the movement thereof in both directions to cause the different entries, to be properly spaced in relation to each other on their respective portions of the record slip.

5. In a machine of the character described, arranged to perform a series of related operations and to provide a duplicate record of the entries relating to each of said related operations, said machine having printing means which functions twice in each operation to print two identical entries on different portions of an insertable slip, the combination of means, including a feed roller, to feed the slip; means, including a shiftable slide, to actuate the roller; means yieldably connected to the slide to shift it back and forth in each machine operation to feed the slip back and forth in relation to the printing means and in synchronism with the operations thereof to cause the duplicate records to be printed on the different portions of said slip; means cooperating with the slide to control the extent of movement thereof in either direction to cause progressive advancement of the slide as it is moved back and forth in each machine operation, to cause the duplicate entries relating to each series of operations to be properly line-spaced, and differentially adjustable devices to control said last mentioned means.

6. In a machine of the class described, arranged to perform a series of related operations and to provide a duplicate record of the entries relating to each of said operations, said machine having printing means which functions twice in each operation to print two identical entries upon different portions of an insertable slip, said machine also having elements to control the different related operations, the combination of a pressure roller; a feed roller mounted to yieldingly press the slip against the pressure roller for the purpose of feeding it; means, including a shiftable slide, to actuate the feed roller; means yieldably connected to the slide and operable to shift it back and forth each machine operation to shift the slip back and forth in relation to the printing means to cause the two identical records to be printed on different portions of said slip; two sets of stop surfaces on the slide; and a stop bar for each set of stop surfaces, said bars being positionable in relation to said surfaces and under control of the control elements to co-act with said surfaces to cause progressive advancement of the slide as it is moved back and forth in each machine operation to cause the duplicate entries relating to each series of machine operations to be spaced in sequential order on their respective portions of the slip.

7. In a machine of the character described, arranged to perform a series of related operations and to provide a duplicate record of the entires relating to each of said operations, said machine having printing means which functions twice in each machine operation to print two identical entries relating to each operation upon different portions of an insertable slip, said machine also having control elements to control the different related operations, the combination of a rockable frame; a slip feed roller mounted in the frame; a pressure roller; yieldable means to rock the frame to cause the feed roller to press the slip against the pressure roller to effect the feeding of said slip; means to restore the rockable frame, against the action of the yieldable means, to ineffective position in the last of the series of related operations to separate the rollers, said means effective to retain said frame in ineffective position until the first of the succeeding series of operations; means including a shiftable slide to operate the feed roller; means to shift the slide back and forth in each machine operation to feed the slip back and forth in relation to the printing means to cause the two identical entries relating to each operation to be printed on their respective portions of said slip; two sets of stop surfaces on the slide; a stop bar for each set of stop surfaces and coacting therewith to control the position of the slide; and means, including cams positioned under control of the control elements and including connections between said cams and the bars, to adjust said bars in relation to the corresonding stop surfaces to cause said bars, in cooperation with said corresponding stop surfaces, to cause progressive advancement of the slide step by step, as it is moved back and forth in each machine operation, to cause the duplicate entries relating to each series of related operations to be properly line-spaced on their respective portions of the slip.

8. In a machine of the class described having printing elements and impression means coacting therewith twice in each machine operation to make two identical recordings upon different portions of an insertable ticket, said machine arranged to perform a sequence of related operations to make such recordings on said ticket, the combination of a plurality of keys to control the item-entering operations; a differential device positioned under control of the keys; a pressure roller; a rockable framework; a slip feed roller supported by said rockable framework; yieldable means to rock the framework to cause the feed roller to press the slip against the pressure roller to cause feeding of said slip upon rotation of said roller means normally effective to restrain the rockable frame to hold the rollers apart; means to withdraw the holding means; means including a shiftable slide to revolve the feed roller; means having an invariable movement to shift the slide in two directions, yieldable means connecting the slide to the shifting means; graduated steps on the slide; and means, including two bars positionable under control of the differential device and cooperating with the steps, to control the extent of shifting movement of the slide in either direction to cause the duplicate recordings of each operation to be properly and sequentially spaced on their respective portions of the insertable ticket.

9. In a machine of the class described, having printing elements and impression means coacting with said elements twice in each machine operation to make two identical recordings on an insertable ticket, said machine arranged to perform a sequence of related operations to make such recordings, the combination of a plurality of control members; a differential device positioned under control of said members; a pressure roller; a rockable frame normally held against movement; a feed roller mounted in the frame; yieldable means to rock the frame upon its release, to cause the feed roller to yieldingly press the ticket against the pressure roller to cause feeding said ticket upon rotation of said feed roller; a pawl on the frame; means having an invariable movement in each machine operation and coacting with the pawl to release said rockable frame and to rock the frame back to ineffective position in each machine operation; means normally effective to move the pawl out of cooperative relationship with the rocking means to prevent it from rocking the frame to ineffective position; means, including a shiftable slide, to revolve the feed roller to feed the ticket;

means having an invariable movement to shift the slide in two directions to feed the ticket back and forth; yieldable means connecting the slide to the shifting means; graduated steps on the slide; two bars positioned by the differential device in relation to the steps and coacting with said steps to control the extent of movement of the slide in both directions to cause the ticket to be progressively advanced step by step, so that the two identical recordings relating to each series of related machine operations will be printed in sequential order in two different places on the ticket; and means effective in the last of the sequence of operations to restore the pawl into cooperative relationship with the rocking means to cause it to restore the frame to ineffective position to separate the feed and pressure rollers so that the ticket may be removed.

10. In a machine of the character described, arranged to perform a sequence of related operations to record items and totals of said items on an insertable ticket, said machine having printing elements and impression means coacting therewith, twice in each of the sequences of operation to print two identical records of such items and totals on two different portions of said ticket, said machine having control keys and a differential device positioned under control of said keys to control the sequence of operations, the combination of means, including a feed roller, to feed the ticket; means, including a shiftable slide, to revolve the feed roller; means having an invariable movement to shift the slide in two directions to feed the ticket back and forth; yielding driving means connecting the shifting means to the slide to allow the slide to be moved various extents; and means positioned by the differential device and cooperating with the slide to control the extent of shifting movement thereof in either direction under influence of the yielding driving means to cause the identical item and total records relating to each of the sequences of operation to be printed in sequential order and one above the other on two different portions of the ticket.

11. In a machine of the character described, arranged to perform a sequence of related operations to record items and totals of said items on an insertable ticket, said machine having printing elements and impression means coacting therewith, twice in each of said sequence of operation to print an original record of such items and totals on a stub portion of said ticket and to print a duplicate record of such items and totals on a main portion of said ticket, the combination of control keys; a differential device positioned under control of said control keys; means, including a feed roller, to feed the ticket; means, including a shiftable slide, to revolve the feed roller; means having an invariable movement to shift the slide in two directions in each machine operation; yieldable means connecting the slide to the shifting means to feed the ticket back and forth in relation to the printing elements and in synchronism with the operation of the impression means to cause the original record of each operation to be printed on the stub and to cause the duplicate record of each operation to be printed on the main portion of said ticket; stop surfaces on the slide; and means positioned under control of the differential device and coacting with the stop surfaces to control the extent of movement of the slide in either direction to cause the original record of items and totals and the duplicate record of items and totals to be properly line-spaced on the stub portion and on the main portion of the ticket.

12. In a machine of the character described, arranged to perform a series of related operations to record items and totals of said items on an insertable ticket, said machine having printing elements and impression means coacting with said elements, twice in each machine operation, to print two identical records of items and totals relating to each operation on different portions of the ticket, the combination of means movable in two directions, to feed the ticket back and forth in relation to the printing elements and in synchronism with the operation of the impression means to cause one printing of the two identical records of each operation to be made on one portion of the ticket and to cause another printing of said two identical records to be made on another portion of said ticket one set of said two identical records being directly beneath the other set of two identical records; means to control the movement of the feeding means in one direction to cause the recordings of said items and their total on said one portion of said ticket to be properly line-spaced; means to control the movement of the feeding means in another direction to cause the recordings of said items and their total on said other portion of said ticket to be properly line-spaced; a driver for said movable means; and means connecting said driver to said movable means to control the synchronizing of the movable means with the operation of the impression means as determined by the means which controls the movement of the feeding means in one direction, and as determined by the means which controls the movement of the feeding means in another direction.

13. In a machine of the class described, arranged to perform a series of related operations to record data on an insertable record slip, said machine having printing elements and impression means coacting therewith, twice in each of said related operations, to print two identical records thereof on different portions of the slip, the combination of means, including a roller, to feed the slip; means to revolve the feed roller; means to operate the revolving means in two directions to feed the slip back and forth in relation to the printing elements and in synchronism with the operation of the impression means to cause the first record relating to each operation to be printed on one portion of said slip and to cause the duplicate of said first record relating to each operation to be printed on another portion of said slip; means connecting the operating means to the revolving means so that the revolving means may be moved variable extents to synchronize the movements of the revolving means with the impression means; means coacting with the revolving means to control its extent of movement in one direction to cause the first records relating to each operation to be properly spaced on said one portion of the record slip; and means coacting with the revolving means to control its extent of movement in another direction to cause the duplicate records relating to each operation to be properly spaced on said other portion of said record slip directly below said first records.

14. In a machine of the character described, arranged to perform a series of related operations to provide the proper information on an insertable record slip, said machine having printing elements and impression means coacting with said elements twice in each machine operation to print two identical records of each operation on two different portions of said record slip, the combination of a pressure roller; a rockable frame; a feed roller mounted in the rockable frame; yieldable means to rock the frame to cause the feed roller to press the slip against the pressure roller to feed said slip upon rotation of said feed roller; means normally effective to restrain the frame against the action of the yieldable means to hold the rollers apart, said means effective to release the frame to the action of the yieldable means at the beginning of the sequence of operations and to return said frame to ineffective position at the end of said sequence of operation; means, including a shiftable slide, to revolve the feed roller; means having an invariable movement each machine operation to shift the slide in two directions, to feed the slip back and forth in relation to the printing element and in synchronism with the two operations of the impression means, to cause the first recording relating to each operation to be made on one portion of the slip and to cause the corresponding duplicate recording corresponding to each of said operations to be made on another portion of the slip; yieldable means connecting the shifting means to the slide so that the movement of said slide may be varied; means coacting with the slide to control its extent of movement in one direction to cause the first or original records relating to each series of operations to be properly line-spaced on said one portion of the slip; and means coacting with the slide to control its extent of movement in another direction to cause the duplicate records relating to said series of operations to be properly line-spaced on said other portion of said slip.

15. In a machine of the class described, arranged to perform a series of related operations to provide the proper information on an insertable slip, said machine having printing elements and impression means coacting with said elements twice in each machine operation to print two identical records relating to each operation on different portions of said slip, the combination of a pressure roller; a rockable frame; a feed roller mounted in the rockable frame; yieldable means to rock the frame to cause the feed roller to yieldingly press the slip against the pressure roller to cause feeding of said slip upon rotation of said feed roller; means effective near the end of the series of operations to rock the frame, against the action of the yieldable means, to ineffective position to disengage the roller, said means also effective to retain the frame in ineffective position until the first of a succeeding series of related operations is initiated; means, including a shiftable slide, to rotate the feed roller; means having a fixed pattern of movement in each machine operation to shift the slide in two directions to feed the slip back and forth in synchronism with the operation of the impression means, to cause the first recording in each related machine operation to be made on one portion of the slip and to cause a duplicate of said first recording to be made on another portion of the slip; yieldable means connecting the shifting means to the slide to vary the extent of movement of said slide in each direction; two sets of positioning surfaces on the slide; means, cooperating with one set of surfaces, to control the extent of movement of the slide in one direction, to cause the first recordings relating to the series of related machine operations to be properly line-spaced on said one portion of the slip; and means, cooperating with the other set of surfaces, to control the extent of movement of the slide in another direction, to cause the duplicate recordings relating to the series of related machine operations to be properly line-spaced on said other portion of said slip.

16. In a machine of the character described, arranged to perform a series of related operations to provide the proper information on an insertable slip, said machine having printing elements and impression means coacting therewith twice in each machine operation to print two identical records relating to each operation on different portions of said slip, said machine also having control elements to control the series of operations, the combination of a pressure roller; a rockable frame; a feed roller mounted in the frame; yieldable means to rock the frame to cause the feed roller to yieldingly press the slip against the pressure roller to feed said slip upon rotation of said feed roller; means, effective near the end of the series of operations to rock the frame, against the action of the yieldable means, to ineffective position to disengage the rollers, said means also effective to retain the frame in ineffective position until the first of a succeeding series of operations is initiated; means, including a shiftable slide, to rotate the feed roller; means, having a constant pattern of movement in each machine operation, to shift the slide in two directions to feed the slip back and forth in synchronism with the operation of the impression means to cause the first recording to be made on one portion of the slip and to cause a duplicate of the first recording to be made on another portion of the slip; yieldable means connecting the shifting means to the slide so that the extent of movement of said slide in each direction may be varied; two sets of positioning surfaces on said slide; means, positioned under control of the control elements and coacting with one set of surfaces, to control the extent of movement of the slide in one direction, to cause the original recordings to be properly spaced on one portion of the slip; and means, positioned under control of the control elements and coacting with the other set of surfaces, to control the extent of movement of the slide in another direction to cause the duplicate recordings to be properly spaced on said other portion of the slip.

17. In a machine of the character described, arranged to perform a series of related operations to record items and totals of said items on an insertable record slip, said machine having printing elements and impression means coacting with said elements twice in each machine operation to print two identical records of said items and then total different portions of said slip, said machine also having control elements to control the series of operations, the combination of a pressure roller; a rockable frame; a feed roller mounted in the frame; yieldable means to rock the frame to cause the feed roller to yieldingly press the slip against the pressure roller to feed said slip upon rotation of said feed roller; means, effective near the end of the series of operations to rock the frame, against the action of the yieldable means, to ineffective position to disengage the roller, said means also effective to retain the frame in ineffective position until the first of the succeeding series of operations is initiated; means, including a shiftable slide, to rotate the feed roller; means, having a fixed back-and-forth movement in each machine operation, to shift the slide in two directions to feed the slip back and forth in relation to the printing elements and in synchronism with the operation of the impression means, to cause the original recordings to be made on one portion of the slip and to cause a duplicate of the original recordings to be made on another portion of the slip; yieldable means connecting the shifting means to the slide so that the extent of movement of said slide in each direction may be varied; two sets of positioning surfaces on said slide; means, including a bar positioned under control of the control elements and coacting with one set of surfaces, to control the extent of movement of the slide in one direction to cause the original recordings to be properly line-spaced on said one portion of the slip; means, including a bar positioned under control of the control elements and coacting with the other set of surfaces to control the extent of movement of the slide in another direction to cause the duplicate recordings to be properly line-spaced on said other portion of the slip; and connections between the frame and the first bar to retain said bar out of coacting relationship with the corresponding stop surfaces as long as said frame is in ineffective position.

18. In a machine of the class described, arranged to perform a series of related operations to provide the proper information in the form of recorded data on an insertable slip, said machine having printing elements and impression means coacting with said printing elements twice in each of the series of operations to make a first or an original recording on one portion of the slip and to make a second or a duplicate recording on another portion of said slip, said machine also having control members and a differential device positioned under control thereof to control the series of operations, the combination of a pressure roller; a rockable frame; a feed roller mounted in the frame; yieldable means to rock the frame to cause the feed roller to yieldingly press the slip against the pressure roller to feed said slip upon rotation of said feed roller; means effective near the end of the series of operations, to rock the frame against the action of the yieldable means, to ineffective position to disengage the rollers, and retain the frame in ineffective position until the first of the succeeding series of operations is initiated; means, including a shiftable slide, to rotate the feed roller, said slide returnable to an initial or starting position in the last of the series of related operations; means having an invariable back-and-forth movement in each machine operation, to shift the slide in two directions to feed the slip back and forth to cause the first or original recording in each machine operation to be made on one portion of the slip and to cause the second or duplicate recording in each machine operation to be made on another portion of the slip; yieldable means connecting the shifting means to the slide; two sets of stop surfaces on the slide; a positionable bar cooperating with one set of stop surfaces; another bar cooperating with the other set of surfaces; a cam for each bar, said cams positioned by the differential device, under influence of the control members; connections between each cam and its corresponding bar to adjust said bars in relation to their corresponding set of stop surfaces, to cause the first bar to control the extent of movement of the slide in one direction, to cause the first or original recordings to be properly line-spaced on the said one portion of the slip, and to cause the second bar to control the extent of movement of the slide in another direction, to cause the second or duplicate recordings to be properly line-spaced on said other portion of said slip; and connections between the rockable frame and the first bar to restore and retain said bar in a neutral position out of the path of the corresponding stop surfaces when said frame is rocked to ineffective position.

19. In a machine of the character described, arranged to perform a series of related operations and also arranged to print two identical records relating to each operation on different portions of an insertable slip, said machine having printing elements and impression means coacting therewith twice in each of the related operations to print the two identical records, said machine also having control members and a differential device positioned under control thereof to control the series of related operations, the combination of a pressure roller; a rockable frame; a feed roller mounted in the frame; yieldable means to rock the frame to cause the feed roller to yieldingly press the slip against the pressure roller to effect the feeding of said slip upon rotation of said feed roller; means, effective near the end of the series of related operations to rock the frame, against the action of the yieldable means, to ineffective position to disengage the rollers, said means also effective to hold the frame in ineffective position until the first of a succeeding series of related operations is initiated; means including a shiftable slide, to revolve the feed roller in two directions, said slide returnable to a starting position in the last of the series of related operations; means performing an invariable back-and-forth movement in each machine operation to shift the slide in one direction, after the first operation of the impression means, and to return said slide after the second operation of said impression means to cause said slide, in cooperation with the feed roller, to feed the slip back and forth in relation to the printing elements to cause two identical records of each operation to be printed on different portions of the slip; a first set of stop surfaces on the slide; a first stop bar cooperating with said stop surfaces a first cam positioned by the differential device connections between the cam and the bar to position said bar in relation to the corresponding set of stop surfaces to control the extent of movement of the slide in said one direction to cause one of the two identical series of records to b properly line-spaced on one portion of the slip a second set of stop surfaces on the slide; a second stop bar cooperating with said second surfaces; a second cam positioned by the differential device; connections between said second cam and the second bar to position said second bar in relation to the second set of stop surfaces to cause the other of the two identical series of record to be properly line-spaced on another portion of the slip; and connections between the rockable frame and the second bar, effective to restore and hold said bar in a neutral position out of the path of the corresponding stop surface when said frame is rocked to ineffective position 20. In a machine of the character described arranged to perform a series of related operation and also arranged to print two identical record relating to each operation on different portion of an insertable slip, said machine having printing elements and impression means coacting therewith twice in each of the related operation to print the two identical records, said machine also having members and a differential device positioned under control thereof to control the series of operations, the combination of means, including a feed roller, to feed the slip; means, including a shiftable slide, to revolve the feed roller in two directions to feed the slip back and forth; mechanism performing a fixed pattern of movement in each machine operation, to shift the slide in one direction after the first operation of the impression means and to return said slide after the second operation of the impression means to cause said slide, in cooperation with the feed roller, to feed the slip back and forth in relation to the printing elements to cause the two identical records of each operation to be printed on different portions of said slip; yieldable driving means connecting said mechanism to said slide to provide for variable movements of said slide; a set of stop surfaces on the slide; a bar cooperating with the stop surfaces and adjustable in relation thereto under influence of the differential device, to control the extent of movement of the slide in said one direction to cause one of the two identical series of records to be properly line-spaced on one portion of the slip; another set of stop surfaces on the slide; and a bar cooperating with the latter surfaces and adjustable in relation thereto under influence of the differential device, to control the extent of movement of the slide in said return direction to cause the other of the two identical series of records to be properly line-spaced on another portion of the slip.

MAYO A. GOODBAR.
GEORGE A. COCUP.

REFERENCES CITED

The following references are of record in the file of this patent:

UNITED STATES PATENTS

| Number | Name | Date |
|---|---|---|
| 707,408 | Green | Aug. 19, 1902 |
| 1,203,717 | Duncan | Nov. 7, 1916 |
| 1,936,068 | Marquardt | Nov. 21, 1933 |
| 1,964,552 | Armold | June 26, 1934 |
| 1,985,245 | Elliott | Dec. 25, 1934 |
| 2,002,772 | Gollwitzer | May 28, 1935 |
| 2,081,836 | Racz | May 25, 1937 |
| 2,136,941 | Flood | Nov. 15, 1938 |
| 2,178,339 | Gates | Oct. 31, 1939 |
| 2,203,116 | Wagner | June 4, 1940 |
| 2,206,743 | Elliott | July 2, 1940 |
| 2,238,517 | Colley | Apr. 15, 1941 |
| 2,273,265 | Heyel | Feb. 17, 1942 |
| 2,305,000 | Goodbar | Dec. 12, 1942 |
| 2,339,321 | Crosman | Jan. 18, 1944 |
| 2,345,839 | Spurlino | Apr. 4, 1944 |
| 2,351,541 | Placke | June 13, 1944 |
| 2,362,736 | Weiss | Nov. 14, 1944 |

Certificate of Correction

Patent No. 2,444,564. July 6, 1948.

MAYO A. GOODBAR ET AL.

It is hereby certified that errors appear in the printed specification of the above numbered patent requiring correction as follows: Column 21, line 30, after the numeral and period "76." insert the following paragraph:

*In item total operations, it is desirable to transfer the total being cleared from the item totalizer on the No. 1 totalizer line to the auditor's totalizer on the No. 2 totalizer line, and, to effect this, it is necessary to have the No. 2 totalizer line move in and out in add timing while the item totalizer line moves in and out in total timing.* column 29, line 15, for "stud 383" read *stud 382*; column 41, line 39, for "Figs. 23" read *Fig. 23*; column 51, line 9, after the word "step", second occurrence, strike out the comma and insert the same in line 25 before "to print"; line 52 after "operation" insert a comma; and that the said Letters Patent should be read with these corrections therein that the same may conform to the record of the case in the Patent Office.

Signed and sealed this 12th day of October, A. D. 1948.

[SEAL]

THOMAS F. MURPHY,
*Assistant Commissioner of Patents.*

Certificate of Correction

Patent No. 2,444,564.                                                                                           July 6, 1948.

MAYO A. GOODBAR ET AL.

It is hereby certified that errors appear in the printed specification of the above numbered patent requiring correction as follows: Column 21, line 30, after the numeral and period "76." insert the following paragraph:

*In item total operations, it is desirable to transfer the total being cleared from the item totalizer on the No. 1 totalizer line to the auditor's totalizer on the No. 2 totalizer line, and, to effect this, it is necessary to have the No. 2 totalizer line move in and out in add timing while the item totalizer line moves in and out in total timing.* column 29, line 15, for "stud 383" read *stud 382*; column 41, line 39, for "Figs. 23" read *Fig. 23*; column 51, line 9, after the word "step", second occurrence, strike out the comma and insert the same in line 25 before "to print"; line 52 after "operation" insert a comma; and that the said Letters Patent should be read with these corrections therein that the same may conform to the record of the case in the Patent Office.

Signed and sealed this 12th day of October, A. D. 1948.

[SEAL]

THOMAS F. MURPHY,
*Assistant Commissioner of Patents.*